US006944823B2

(12) United States Patent
Kurumida

(10) Patent No.: US 6,944,823 B2
(45) Date of Patent: Sep. 13, 2005

(54) OUTLINE FORMING APPARATUS AND METHOD USING INPUTTED WEIGHT INFORMATION

(75) Inventor: Tsuneaki Kurumida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/703,399

(22) Filed: Aug. 26, 1996

(65) Prior Publication Data

US 2004/0205486 A1 Oct. 14, 2004

Related U.S. Application Data

(63) Continuation of application No. 08/155,656, filed on Nov. 22, 1993, now abandoned.

(30) Foreign Application Priority Data

Nov. 30, 1992 (JP) ............................................. 4-320670
Jan. 8, 1993 (JP) ............................................. 5-001686

(51) Int. Cl.⁷ .................................................. G06F 17/00
(52) U.S. Cl. ..................................... 715/542; 715/517
(58) Field of Search .................................. 715/542, 517; 395/805, 167, 168, 169, 170, 171, 172, 150, 151; 382/298, 301; 345/124, 127, 128, 129, 130, 141, 142, 143, 144, 467, 468, 469, 470, 471, 472, 194; 707/542

(56) References Cited

U.S. PATENT DOCUMENTS

| 4,817,172 A | | 3/1989 | Cho ............................. 382/21 |
|---|---|---|---|
| 4,897,638 A | * | 1/1990 | Kokunishi et al. .......... 345/142 |
| 5,155,805 A | * | 10/1992 | Kaasila ........................ 395/150 |
| 5,159,668 A | * | 10/1992 | Kaasila ........................ 395/150 |
| 5,189,730 A | * | 2/1993 | Kajimoto ..................... 395/151 |
| 5,276,790 A | * | 1/1994 | Lo et al. ....................... 395/150 |
| 5,280,576 A | * | 1/1994 | Cao ............................. 395/150 |
| 5,295,240 A | * | 3/1994 | Kajimoto ..................... 395/172 |
| 5,325,479 A | * | 6/1994 | Kaasila ........................ 395/150 |
| 5,355,449 A | * | 10/1994 | Lung et al. .................. 395/150 |
| 5,365,589 A | | 11/1994 | Seto et al. .................... 382/22 |
| 5,398,311 A | * | 3/1995 | Seto ............................ 395/171 |
| 5,473,743 A | * | 12/1995 | Watanabe ................... 395/171 |
| 5,519,412 A | * | 5/1996 | Watanabe ................... 345/128 |
| 5,562,350 A | * | 10/1996 | Sakurai ....................... 400/128 |

FOREIGN PATENT DOCUMENTS

| JP | 1-272460 | 10/1989 |
|---|---|---|
| JP | 2-250189 | 10/1990 |
| JP | 4-93992 | 3/1992 |
| JP | 4-162092 | 6/1992 |
| JP | 57-169791 | 10/1992 |

OTHER PUBLICATIONS

Foley et al., *Computer Graphics: Principles and Practice, Second Edition*, Addison–Wesley Publishing Company, Inc., 1990, pp. 488–490.*

Kurumida, "Output Method and Apparatus", U.S. Appl. No. 07/868,683, filed Apr. 15, 1992.*

Kurumida, "Pattern Generation and Pattern Generation Apparatus", U.S. Appl. No. 07/962,051, filed Oct. 16, 1992.*

Fellner, "Computer Grafik", BI–Wissenschaftsverlag, 1988, pp. 143–152.

* cited by examiner

*Primary Examiner*—Sanjiv Shah
(74) *Attorney, Agent, or Firm*—Fitzpatrick, Cella, Harper & Scinto

(57) ABSTRACT

An outline forming apparatus stores first information indicating positions of first outline points for forming an outline of a pattern having a predetermined weight. The apparatus also stores second information, provided for each first outline point individually, for deciding positions of second outline points forming an outline of the pattern having a different weight. When the desired weight of an outline of the pattern is input, the position of each of the second outline points is decided based on the first and second information and the desired weight, and the outline of the pattern is generated using the second points at the decided positions.

10 Claims, 30 Drawing Sheets

FIG. 5A    FIG. 5B    FIG. 5C
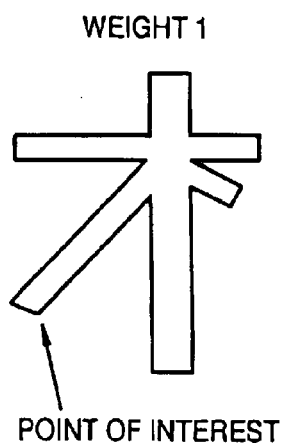
WEIGHT 1
POINT OF INTEREST
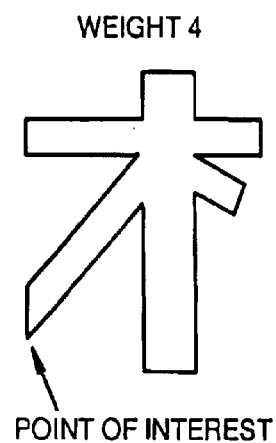
WEIGHT 4
POINT OF INTEREST
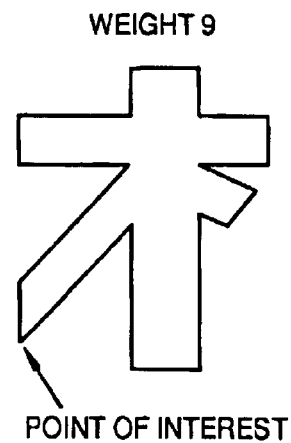
WEIGHT 9
POINT OF INTEREST
FIG. 5D    FIG. 5E
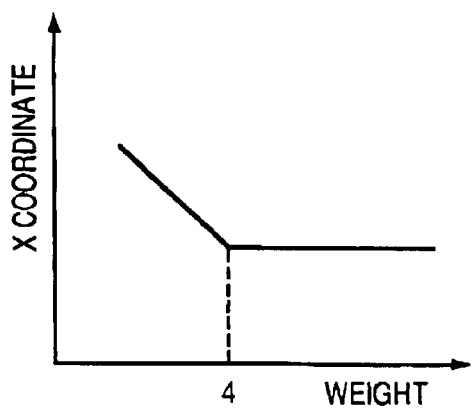
VECTOR OF POINT OF INTEREST
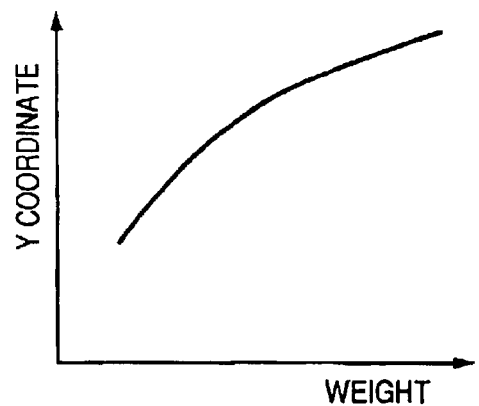
VECTOR OF POINT OF INTEREST

FIG. 6

| | FLAG 1 | FLAG 2 | FLAG 3 | FLAG 4 | X | Y | VEC-X | VEC-Y |
|---|---|---|---|---|---|---|---|---|
| CONTROL-POINT a | START | STR-LINE | 0 | 0 | 50 | 50 | | |
| CONTROL-POINT b | | STR-LINE | 0 | 0 | 800 | 50 | | |
| CONTROL-POINT c | | STR-LINE | 0 | 0 | 800 | 600 | | |
| CONTROL-POINT d | END | STR-LINE | 0 | 0 | 50 | 600 | | |
| CONTROL-POINT e | START | STR-LINE | 1 | 1 | 100 | 100 | 50 | 50 |
| CONTROL-POINT f | | STR-LINE | 1 | 1 | 100 | 300 | 50 | -20 |
| CONTROL-POINT g | | STR-LINE | 1 | 1 | 400 | 300 | -20 | -20 |
| | ------- | ------- | ------- | ------- | ------- | ------- | ------- | ------- |

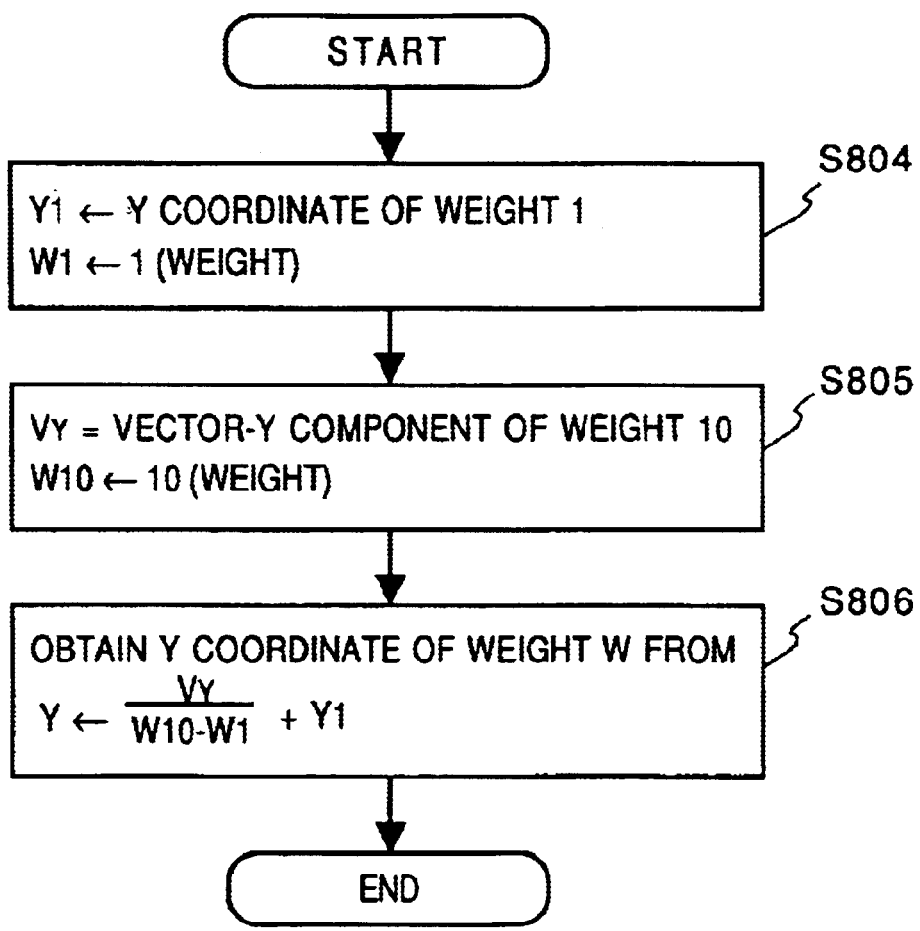

FIG. 9
FIGURE OF WEIGHT 1
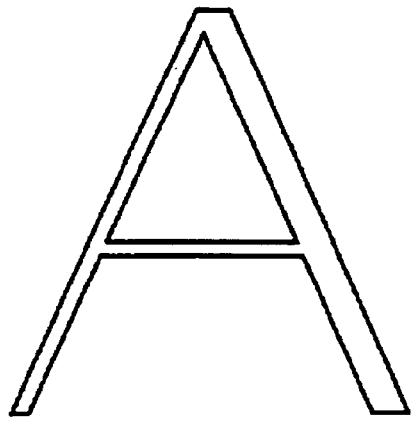
FIGURE OF WEIGHT 10
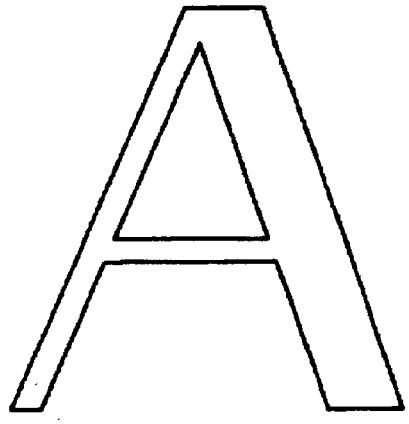
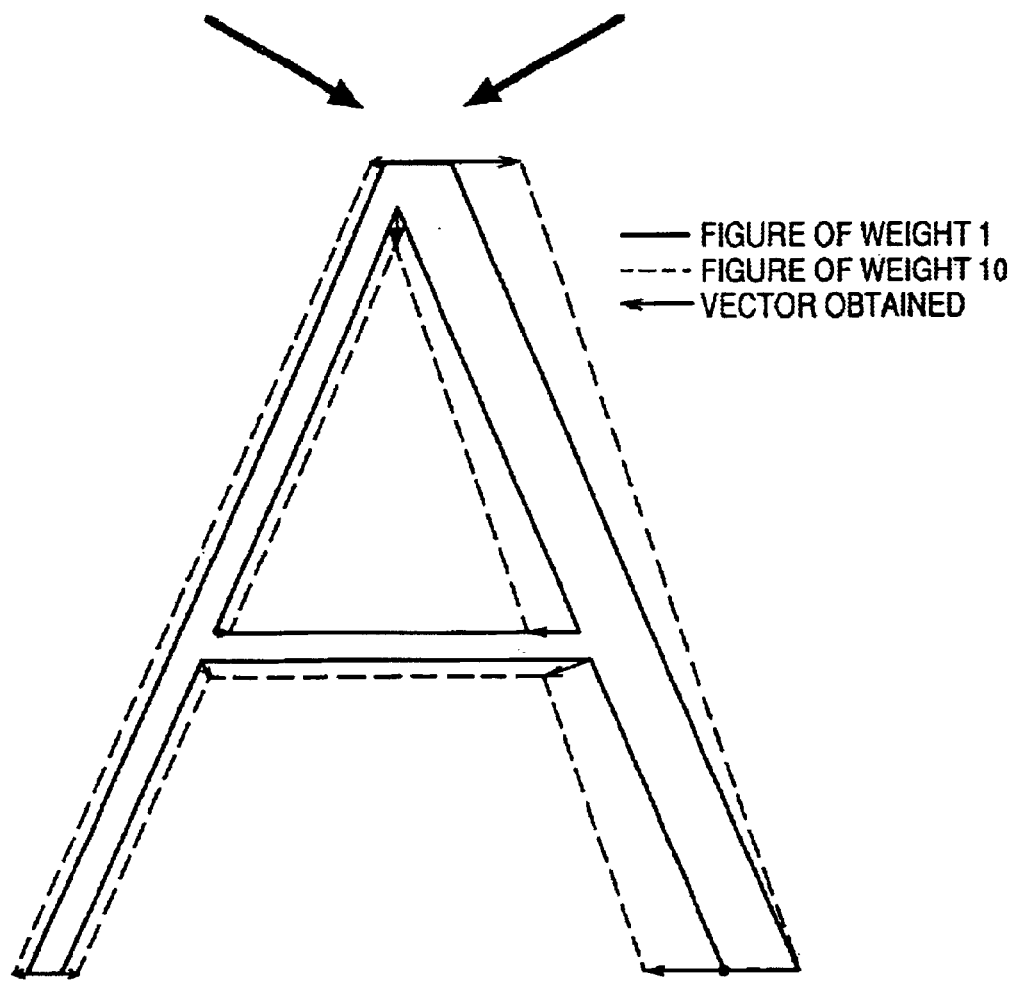
— FIGURE OF WEIGHT 1
--- FIGURE OF WEIGHT 10
← VECTOR OBTAINED

FIG. 11

| FLAG1 | FLAG2 | FLAG3 | FLAG4 | X | Y | VEC-X1 | VEC-Y1 | VEC-X2 | VEC-Y2 | VEC-X3 | VEC-Y3 |
|---|---|---|---|---|---|---|---|---|---|---|---|
| START | STR-LINE | 0 | 1 | 100 | 130 | | -40 | | | | |
| | ST-C | 1 | 1 | 343 | 100 | -10 | -15 | | | | |
| | INT-C | 2 | 2 | 511 | 100 | -20 | 28 | -5 | 10.3 | | |
| | INT-C | 3 | 2 | 511 | 410 | -22 | -43 | -14 | -10 | -2.5 | |
| | EN-C | 1 | 1 | 343 | 410 | -10 | 16 | | | | |
| END | STR-LINE | 0 | 1 | 100 | 380 | | 40 | | | | |
| START | STR-LINE | 1 | 1 | 130 | 200 | 14 | 31 | | | | |
| ------ | ------ | ------ | ------ | ------ | ------ | ------ | ------ | ------ | ------ | ------ | ------ |

FIG. 20

HORIZONTAL-MOVEMENT TABLE

| FLAG OF POINT | FLAG OF POINT OF PAIR | ABSOLUTE VALUE OF AMOUNT OF MOVEMENT |
|---|---|---|
| MOVEMENT IMPOSSIBLE | MOVEMENT IMPOSSIBLE | 0 |
| MOVEMENT IMPOSSIBLE | SMALL AMOUNT OF MOVEMENT | 0 |
| MOVEMENT IMPOSSIBLE | LARGE AMOUNT OF MOVEMENT | 0 |
| SMALL AMOUNT OF MOVEMENT | MOVEMENT IMPOSSIBLE | 10 |
| SMALL AMOUNT OF MOVEMENT | SMALL AMOUNT OF MOVEMENT | 16 |
| SMALL AMOUNT OF MOVEMENT | LARGE AMOUNT OF MOVEMENT | 7 |
| LARGE AMOUNT OF MOVEMENT | MOVEMENT IMPOSSIBLE | 20 |
| LARGE AMOUNT OF MOVEMENT | SMALL AMOUNT OF MOVEMENT | 13 |
| LARGE AMOUNT OF MOVEMENT | LARGE AMOUNT OF MOVEMENT | 10 |

FIG. 21

VERTICAL-MOVEMENT TABLE

| FLAG OF POINT | FLAG OF POINT OF PAIR | ABSOLUTE VALUE OF AMOUNT OF MOVEMENT |
|---|---|---|
| MOVEMENT IMPOSSIBLE | MOVEMENT IMPOSSIBLE | 0 |
| MOVEMENT IMPOSSIBLE | SMALL AMOUNT OF MOVEMENT | 0 |
| MOVEMENT IMPOSSIBLE | LARGE AMOUNT OF MOVEMENT | 0 |
| SMALL AMOUNT OF MOVEMENT | MOVEMENT IMPOSSIBLE | 7 |
| SMALL AMOUNT OF MOVEMENT | SMALL AMOUNT OF MOVEMENT | 13 |
| SMALL AMOUNT OF MOVEMENT | LARGE AMOUNT OF MOVEMENT | 5 |
| LARGE AMOUNT OF MOVEMENT | MOVEMENT IMPOSSIBLE | 14 |
| LARGE AMOUNT OF MOVEMENT | SMALL AMOUNT OF MOVEMENT | 10 |
| LARGE AMOUNT OF MOVEMENT | LARGE AMOUNT OF MOVEMENT | 7 |

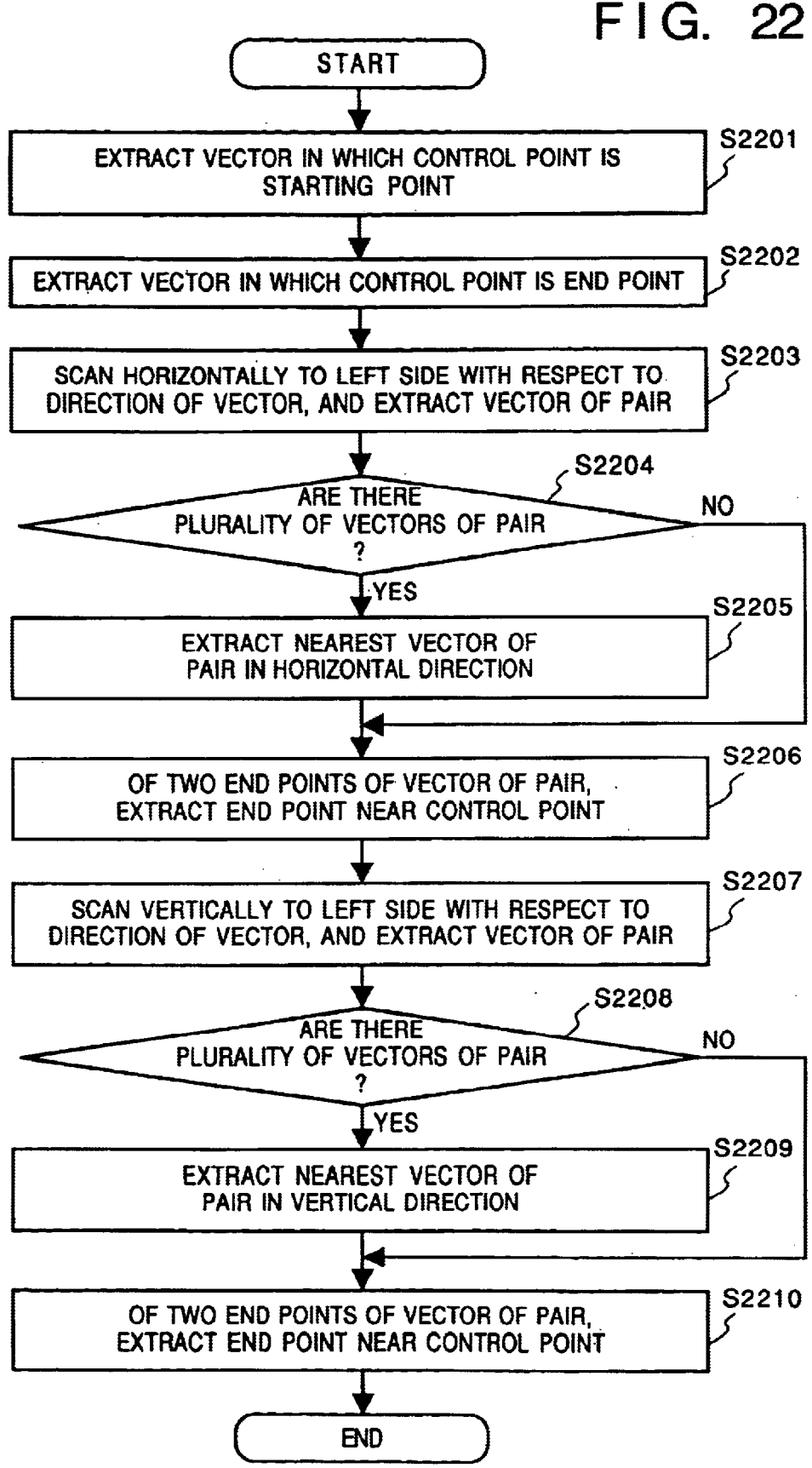

FIG. 24

| FLAG 1 | FLAG 2 | FLAG 3 | FLAG 4 | FLAG 5 | FLAG 6 | X | Y | VEC-X1 | VEC-Y1 | VEC-X2 | VEC-Y2 |
|---|---|---|---|---|---|---|---|---|---|---|---|
| | STR-LINE | 1 | 2 | 4 | 0 | 100 | 130 | 12 | -40 | | -10 |
| | | 0 | | 0 | | 112 | | | | | |
| | | | | | | | | | | | |
| | STR-LINE | 1 | 2 | 5 | 3 | 200 | 410 | -25 | 20 | | 10 |
| | | 1 | 1 | | 7 | 175 | 420 | -10 | 15 | | |
| | | | 0 | | 0 | | 435 | | | | |
| -- | -- | -- | -- | -- | -- | -- | -- | -- | -- | -- | -- |

CONTROL POINT a (rows 1–3)

CONTROL POINT b (rows 4–6)

OUTLINE FORMING APPARATUS AND METHOD USING INPUTTED WEIGHT INFORMATION

This application is a continuation of application Ser. No. 08/155,656 filed Nov. 22, 1993, now abandoned.

BACKGROUND OF THE INVENTION

This invention relates to an outline forming method and apparatus for printing or displaying characters and the like utilizing outline fonts. Further, the invention relates to a method and apparatus for storing outline data, which is used in outline formation for the display and printing of characters or the like, in an outline forming apparatus of the above-mentioned kind.

In general, an outline font is composed of outline data of a character represented by straight lines and curves. A cubic Bezier curve, spline curve or circular arc generally is used as the curve.

Such outline data represents the data of a font having a specific thickness (hereinafter referred to as "weight"). A light font (a font whose weight is light) is represented by outline data for a slender font, and a bold font (a font whose weight is heavy) is represented by outline data for a bold font. In this specification, "weight" is a numeral value representing the thickness of the character, "thickness" is a term for representing the thickness of the contour and "outline" has the meaning of contour.

Accordingly, in order to display or print characters or the like which rely upon fonts having a plurality of weight in the example mentioned above, a problem encountered is that outline fonts having a plurality of weights must be provided for each and every weight.

A system proposed to solve this problem makes it possible to form an intermediate outline font from a bold outline font and a light outline font. However, outline fonts having any desired weight cannot be produced.

Thus, since ordinary outline data does not contain information relating to movement of each control-point for dealing with any weight, the position of each control-point cannot be acquired for any weight.

SUMMARY OF THE INVENTION

Accordingly, a first object of the present invention is to provide an outline forming method and apparatus through which it is possible to generate characters of a plurality of weights by a single item of outline data by providing each point on an outline with movement information for control-point movement, in which weight is adopted as a parameter.

One outline forming apparatus according to the present invention for attaining the foregoing object comprises memory means for storing, with regard to each control-point for forming an outline of a pattern having a prescribed thickness, position information based upon the position of each control-point and movement information based upon a path of movement of each control-point that accompanies a change in weight at the time of outline generation, input means for entering designating information that designates a pattern to be generated and weight at the time of outline generation of the pattern, acquisition means which, with regard to each control-point for forming the pattern designated by the designating information, is for acquiring the position of each control-point that prevails when an outline is generated in the weight designated by the designating information, based upon the position information and movement information, and outline generating means for generating an outline of a pattern based upon the position acquired by the acquisition means.

Further, one outline forming method according to the present invention for attaining the foregoing object comprises a storing step of storing, with regard to each control-point for forming an outline of a pattern having a prescribed thickness, position information based upon the position of each control-point and movement information based upon a path of movement of an control-point that accompanies a change in weight at the time of outline generation, an input step of entering designating information that designates a pattern to be generated and at the time of outline generation of the pattern, an acquisition step, which is executed with regard to each control-point for forming the pattern designated by the designating information, of acquiring the position of each control-point that prevails when an outline is generated in the thickness designated by the designating information, based upon the position information and movement information, and an outline generating step of generating an outline of a pattern based upon the position acquired at the acquisition step.

In accordance with the invention as described above, position information of control-points of a prescribed thickness and movement information relating to the path of a change in position of control-points corresponding to thickness at the time of outline generation is stored in memory. When a pattern whose outline is to be generated and weight are designated by the designating means, the acquisition means acquires position information used in outline generation, namely position information at the time of outline generation, based upon position information and movement information, for outline generation of each control-point of the designated pattern, and the designated thickness. By executing outline generation based upon the position information prevailing at the time of generation, an outline conforming to the designated thickness is obtained.

A second object of the present invention is to provide an outline-data storing method and apparatus for generating movement information of each control-point for making it possible to generate characters having a plurality of weights by control-point data having one type of weight, and storing position information of each control-point of outline data along with the movement information.

One outline-data storing apparatus according to the present invention for attaining the foregoing object comprises first memory means for storing outline data having position information of each control-point corresponding to a prescribed weight as well as thickness information indicating this weight, generating means for generating movement information, which is for moving the position of an control-point in correspondence with a change in weight of an outline pattern to be generated, based upon outline data corresponding to the prescribed weight, and second memory means for storing the movement information, which is generated by the generating means, along with the position information of each control-point.

Further, one outline-forming method according to the present invention for attaining the foregoing object comprises a first storing step of storing outline data having position information of each control-point corresponding to a prescribed weight as well as thickness information indicating this weight, a generating step of generating movement information, which is for moving the position of each control-point in correspondence with a change in weight of an outline pattern to be generated, based upon outline data corresponding to the prescribed weight, and a second storing step of storing the movement information, which is generated at the generating step, along with the position information of each control-point.

In accordance with this aspect of the invention, movement information for moving the position of each control-point in correspondence with a change in weight is generated from outline data having at least position information of each control-point and weight information stored in a memory medium. The movement information generated is stored in a memory medium along with the position information of each control-point.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram showing examples in which a function representing an control-point movement vector is changed;

FIG. 6 is a table representing a portion of the composition of outline data for the kanji character "田" in FIG. 3;

FIGS. 8A and 8B illustrates the manner in which the expression of a primary function representing an control-point movement vector is obtained;

FIG. 9 is a diagram representing an example in which an control-point movement vector is fetched from outline data of two weights;

FIG. 11 is a table showing the composition of outline data in a second embodiment;

FIG. 20 is a table showing the constitution of data in a horizontal-movement table;

FIG. 21 is a table showing the constitution of data in a vertical-movement table;

FIG. 22 is a flowchart showing a procedure for fetching an control-point forming a pair with an control-point of interest;

FIG. 24 is a table showing constitution of outline data in a fifth embodiment of the invention;

DESCRIPTION OF THE PREFERRED EMBODIMENTS

Preferred embodiments of the present invention will now be described in detail in accordance with the accompanying drawings.

[First Embodiment]

Figure 1:
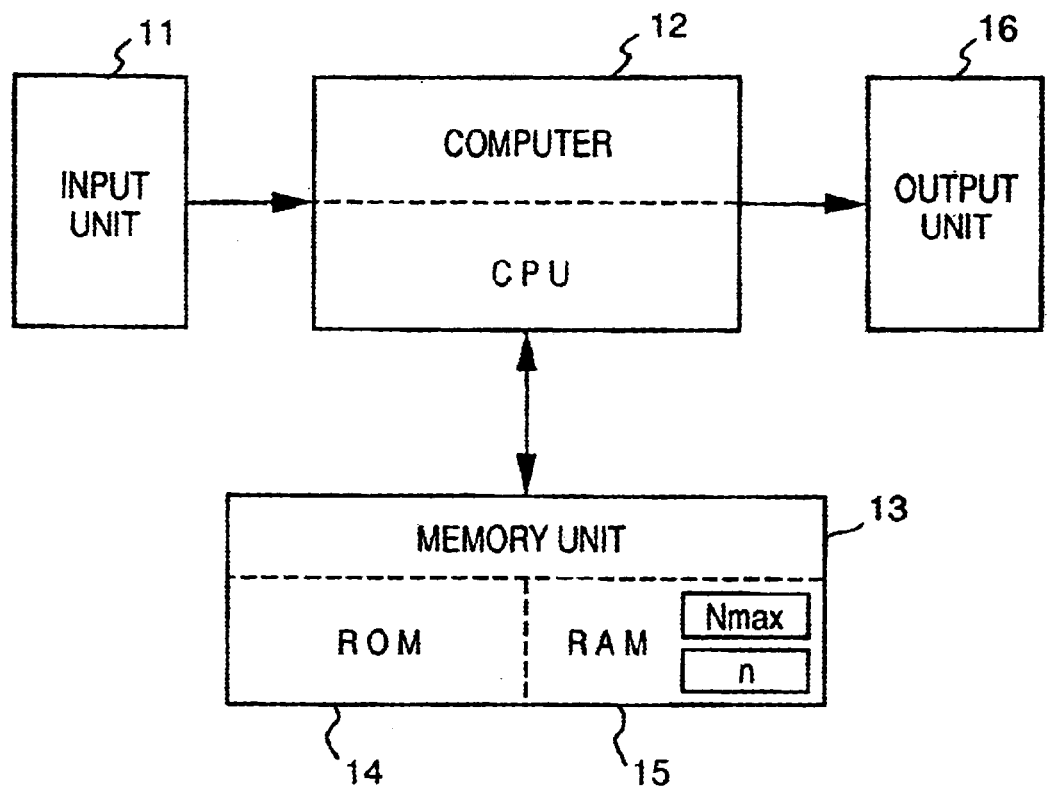
FIG. 1 is a block diagram illustrating the general control configuration of an outline forming apparatus according to an embodiment of the present invention.

FIG. 1 is a block diagram illustrating the general control configuration of an outline forming apparatus according to this embodiment.

The apparatus includes an input unit 11 for accepting code information, which specifies a pattern to be outputted, and weight information for specifying the weight of the pattern. In this embodiment, a character is dealt with as one example of a pattern to be outputted, and a code specifying the pattern shall be referred to as a character code. The input unit 11 is connected to a computer (CPU) 12 for computing the outline data of a character from the character code and weight information accepted by the input unit 11. The CPU 12 is connected to a memory unit 13 having a ROM (read-only memory) 14 and a RAM (random-access memory) 15. The ROM 14 stores basic character data and the like, and the RAM 15 is used as a work area for computations performed by the CPU 12. In addition, the RAM 15 temporarily stores character outline data, which is obtained when the basic character data in the ROM 14 is processed by the CPU 12. The CPU 12 is further connected to an output unit 16, which outputs the character outline data obtained as a result of the processing performed by the CPU 12. It should be noted that the ROM 14 stores programs for executing control represented by various flowcharts, described below.

Figure 2:
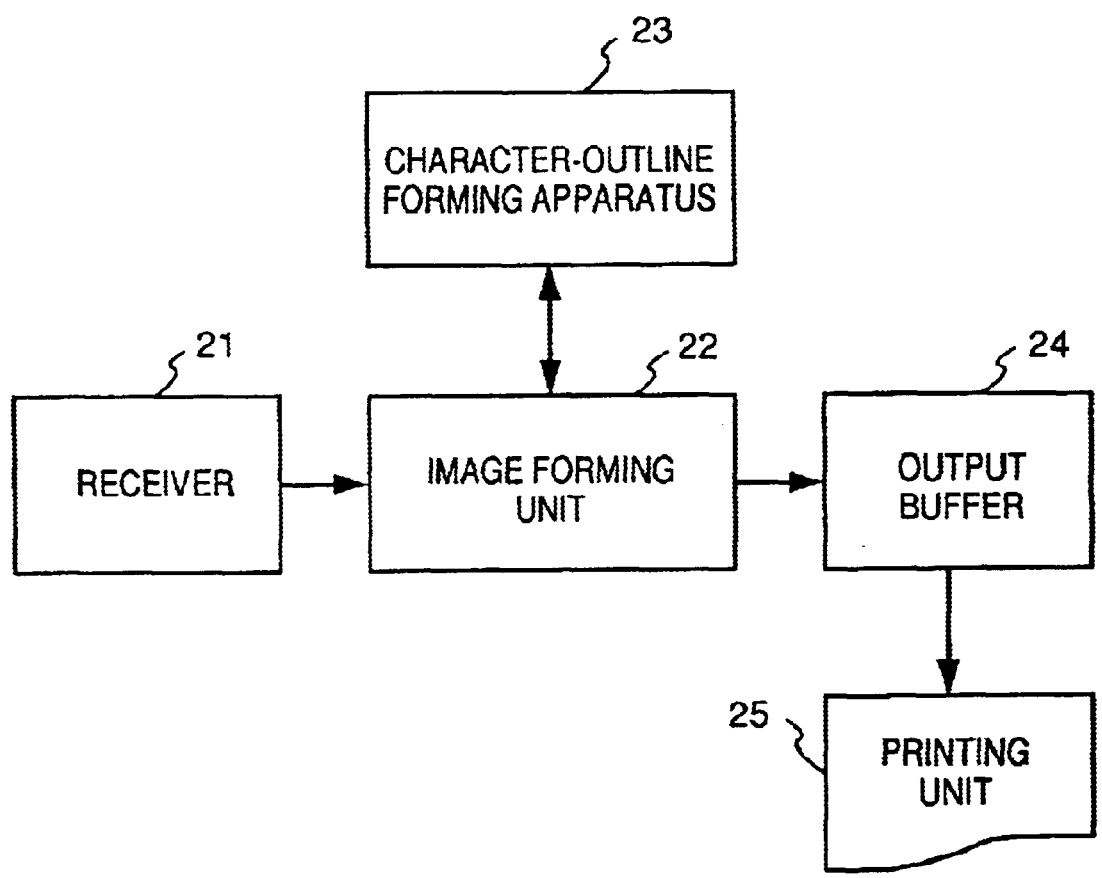
FIG. 2 is a block diagram illustrating the general control configuration in a case where the outline forming apparatus of the embodiment is incorporated in a laser-beam printer.

FIG. 2 is a diagram illustrating an example of application of the outline forming apparatus according to this embodiment. FIG. 2 is a block diagram illustrating the general control configuration in a case where this outline forming apparatus is incorporated in a laser-beam printer. Numeral 21 denotes a receiving unit for receiving print data from a host computer. Numeral 22 denotes an image forming unit comprising such circuits as a CPU, a ROM and a RAM. Numeral 23 denotes an outline forming apparatus 23 according to this embodiment. The CPU 12, ROM 14 and RAM 15 in FIG. 1 are shared by the image forming unit 22. Control of this apparatus is performed by the CPU 12. The program for this control is stored in the ROM 14. Numeral 24 denotes an output buffer for temporarily preserving, in the format of a bitmap, the image formed by the image forming unit 22. Numeral 25 denotes a printing unit which, on the basis of the data stored in the output buffer 24, generates pulses for driving a laser, thereby forming an image on paper by means of toner.

The receiving unit 21 receives print data containing character codes and weight information from the host computer, which is not shown. The character outline forming apparatus 23 and the image forming unit 22 move each control-point of a character, which has been designated by a character code, for the purpose of forming an outline in a weight designated by the weight information, and developing a pattern in the output buffer 24 using the control-points moved. Thus, a character pattern whose thickness has been designated by weight information is obtained.

Figure 3:
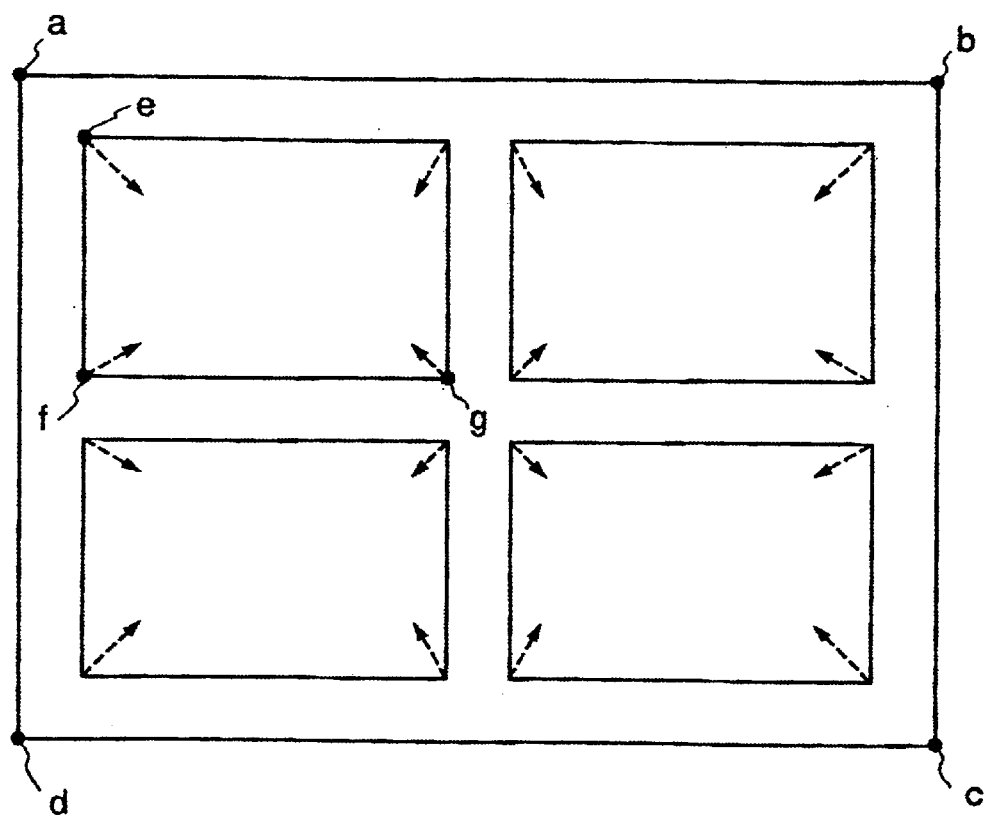
FIG. 3 is a diagram showing an example of a font-data format.

FIG. 3 illustrates an example of the format of font data used in the outline forming apparatus of this embodiment. The data is for that of the kanji character "田" of Gothic type. The portion indicated by the solid lines in FIG. 3 represents outline data when the character weight is 1. The vectors (arrows) indicated by the dashed lines are vectors representing the path of movement of each control-point when the weight is changed. Each control-point movement vector is such that X and Y coordinates are represented as a function of weight.

Figure 4:
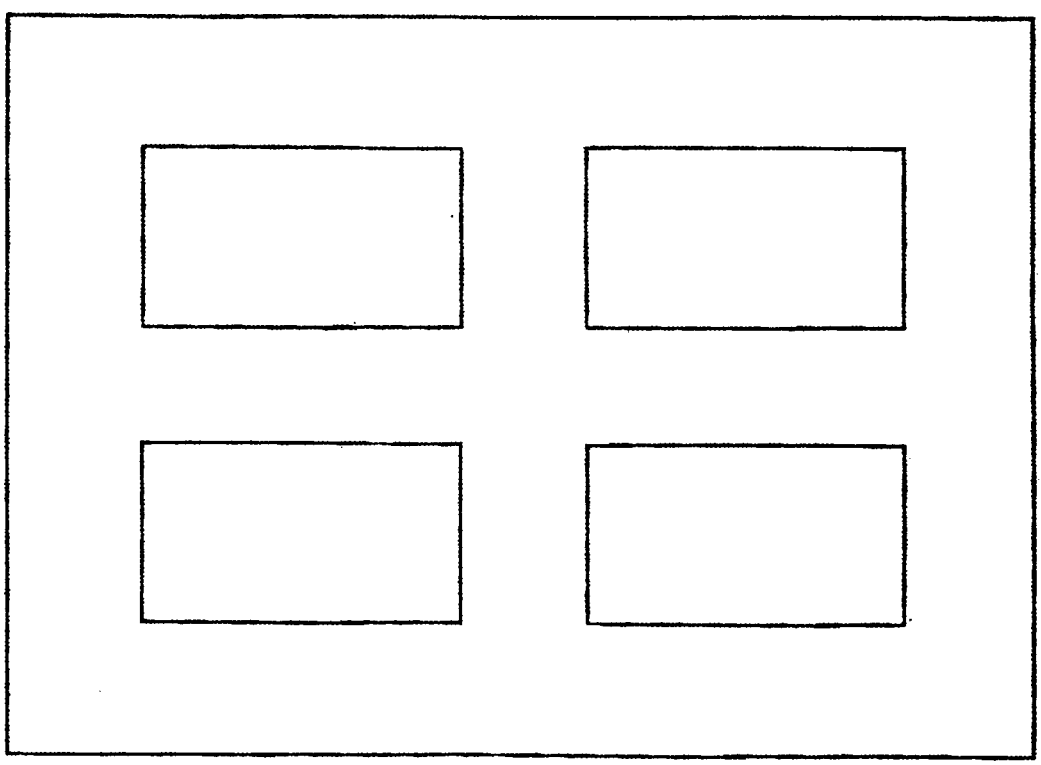
FIG. 4 is a diagram showing the state in which the font data of FIG. 3 is outputted at weight 10.

FIG. 4 is a diagram showing the outline data of the Gothic kanji character "田" when the weight is 10. In this embodiment, a weight of 1 represents the lightest outline and a weight of 10 represents the boldest outline.

The end point of each control-point movement vector in FIG. 3 indicates the position of each control-point in a case where the weight is 10. Accordingly, the character pattern of weight 10 is obtained, as shown in FIG. 4, by using control-points represented by the end points of these control-point movement vectors.

As shown in FIG. 3, the outline data in this embodiment has coordinate data representing the outline of the character and data (referred to as "vector data" hereinafter) relating to control-point movement vectors representing the path of movement of the outline coordinates that accompanies a change in weight. As illustrated in FIG. 3, the vector data of each control-point of the kanji character "田" is data for which there are no vectors (e.g., control-points a, b, c, d) and data in which X and Y coordinates are each represented by primary functions (e.g., control-points e, f, g), with weight serving as a parameter.

FIG. 6 is a diagram representing a portion of the composition of outline data for the kanji character "田" in FIG. 3.

The data of the control-points a~g of FIG. 3 is illustrated in FIG. 6. Here a flag 1 is a flag representing the start/end of an outline; a flag 2 is a flag representing the attribute of an outline (in the flag 2, STR-LINE represents a straight line); a flag 3 is a flag representing the degree of a function in the X direction of an control-point movement vector; and a flag 4 is a flag representing the degree of a function in the Y direction of an control-point movement vector. When the flag 3 is 0, this represents that the coordinate value in the X direction of the control-point movement vector does not change. When the flag 3 is 1, this represents that the coordinate value in the X direction of the control-point movement vector varies in the manner of a primary function, i.e., linearly, with respect to a change in weight. Similarly, when the flag 4 is 0, this represents that the coordinate value in the Y direction of the control-point movement vector does not change. When the flag 4 is 1, this represents that the coordinate value in the Y direction of the control-point movement vector varies in the manner of a primary function, i.e., linearly, with respect to a change in weight.

In FIG. 6, the X coordinate (X) and Y coordinate (Y) represent the coordinates of each control-point of weight 1. Further, the vector-x component (VEC-X) and vector-Y component (VEC-Y) are such that the positions of respective control-points when the weight is 10 are represented by the amount of movement from the coordinates of the control-points of weight 1.

Figure 7:
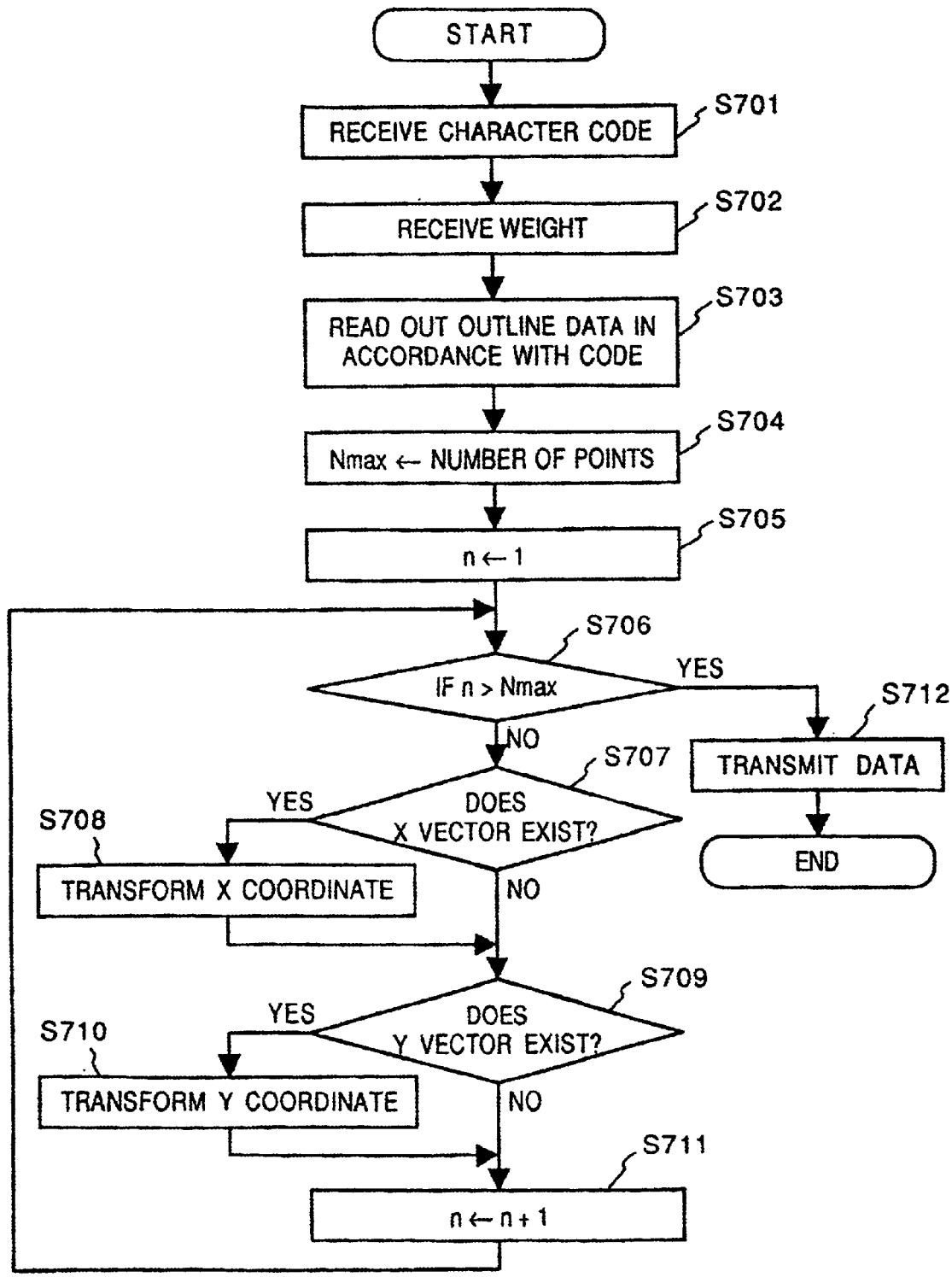
FIG. 7 is a flowchart illustrating a procedure for controlling outline formation according to the first embodiment.

FIG. 7 is a flowchart illustrating a procedure for controlling outline formation according to the first embodiment. First, a character code of a character to be outputted is received at step S701 and weight information is received at step S702. More specifically, a character code and weight information are entered at the input unit of FIG. 1. Basic outline data is read out of the ROM 14 at step S703 in accordance with the character code received at step S701. Next, at step S704, the number of control-points having outline data read out of the ROM is substituted into Nmax. This is followed by step S705, at which 1 is substituted into a counter variable n. It should be noted that Nmax and n are stored in the RAM 15, as shown in FIG. 1.

It is determined at step S706 whether n has exceeded Nmax. The program proceeds to step S712 if n exceeds Nmax and to step S707 if it does not. The processing of steps S707~S710 indicates processing regarding an n-th item of data of the outline data, as shown in FIG. 6. It is determined at step S707 whether the n-th item of control-point data possesses an control-point movement vector in the X direction. (If the flag 3 is not 0, then the data has an control-point movement vector.) The program proceeds to step S708 if the data has an control-point movement vector and to step S709 if the data does not have an control-point movement vector. At step S708, the X coordinate of the control-point is calculated from the weight information and vector data of the control-point movement vector (this will be described later with reference to FIG. 8A). It is determined at step S709 whether the n-th item of control-point data possesses an control-point movement vector in the Y direction. (If the flag 4 is not 0, then the data has an control-point movement vector.) The program proceeds to step S710 if the data has an control-point movement vector and to step S711 if the data does not have an control-point movement vector. At step S710, the Y coordinate of the control-point is calculated from the weight information and vector data of the control-point movement vector (this will be described later with reference to FIG. 8B). The counter variable n is incremented at step S711, after which the program returns to step S706 so that processing may be executed with regard to the next control-point. Data which has been transformed is transmitted from the output unit 16 at step S712, after which processing is terminated.

Figure 8A:
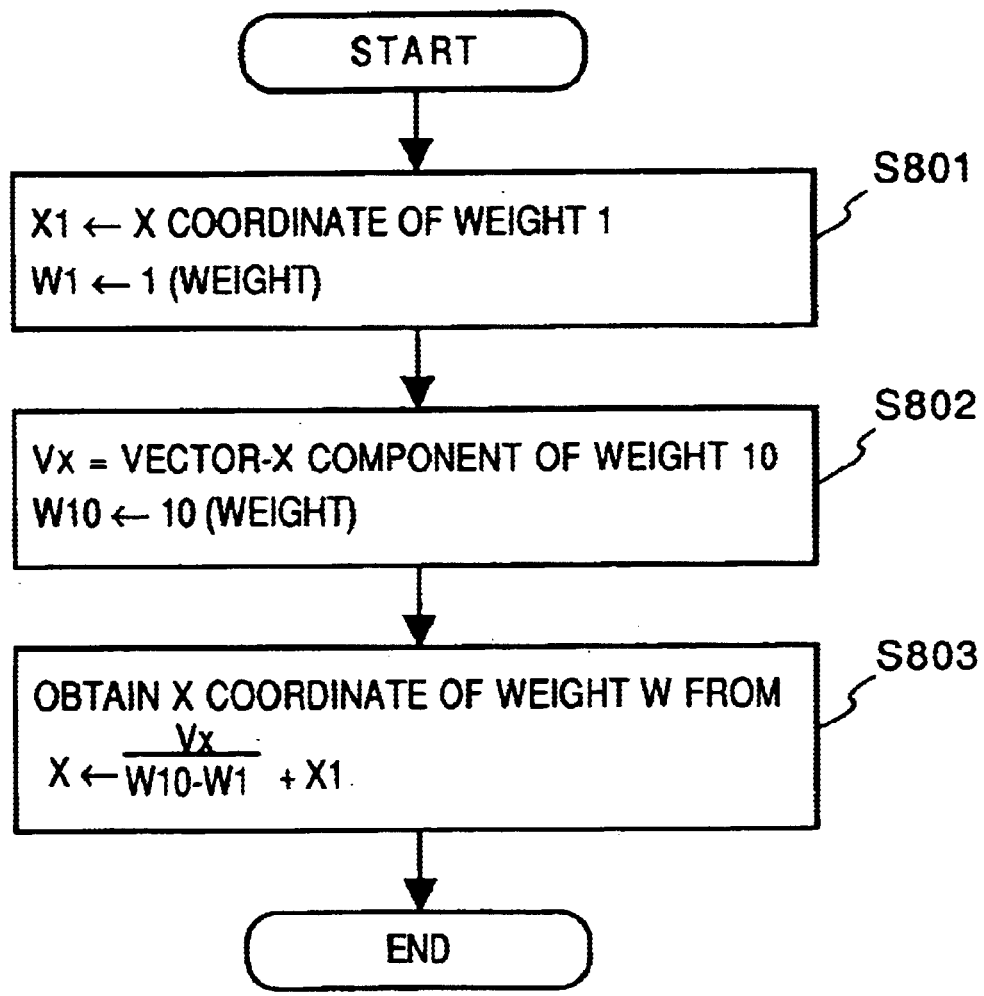

FIGS. 8A and 8B are flowcharts illustrating a method of obtaining the expression of a primary function representing an control-point movement vector. In this example, a primary function is represented by the coordinates (X, Y coordinates) of an control-point of weight 1 and the coordinates (indicated by a vector-x component and a vector-Y component) of the components of an control-point movement vector, as indicated by the constitution of the outline data of FIG. 6. It goes without saying that the coordinates of the end point are obtained from the amount of movement of each control-point. More specifically, since the starting point and the value of each component of the control-point movement vector are known, constants A, B may be decided with ease and a primary function can be obtained. It is possible to obtain character outline data of any weight by this primary function.

At step S801 in FIG. 8A, the X-coordinate value of the control-point (the X coordinate of the outline data of FIG. 6 indicates the X-coordinate value of weight 1) is substituted into X1, and 1 (the weight) is substituted into W1. At step S802, the X-direction component value of the vector is substituted into X10, and 10 (the weight) is substituted into W10. The data set at steps S801 and S802 are used at step S803 to obtain an X-coordinate value regarding any weight (W). A Y-coordinate value regarding any W can be obtained similarly (steps S804–S806 in FIG. 8B).

FIG. 9 is a diagram representing an example in which an control-point movement vector of each control-point is calculated automatically. In this example, an control-point movement vector is fetched from outline data of two weights. According to this example, an control-point movement vector is obtained from the positional coordinates of control-points of weights 1 and 10 of the character "A". More specifically, a vector is obtained by adopting each control-point of weight 1 as a starting point and each control-point of weight 10 as an end point. If these values are described in accordance with the composition of data shown in FIG. 6, the X and Y coordinates will be the coordinates of each control-point of weight 1, and the X and Y coordinates of the end point of each control-point movement vector will be the difference between the X and Y coordinates of weight 10 and the X and Y coordinates of weight 1 (namely the vector-x component and the vector-Y component).

Of course, the control-point movement vector of each control-point may be obtained using a different method. Further, it is also possible for a designer to revise an control-point movement vector. If control-point movement vectors obtained are identical, then it goes without saying that the method of obtaining the vector has no effect upon the generation of character outline data having a different weight.

It should be noted that depending upon the control-point, there are instances where one or both of the vector-x component and vector-Y component does not exist. Whether or not the vector-x component and vector-Y component exist is identified by the flags 3 and 4, respectively. Accordingly, a portion for which no vector data exists can be stored in less memory space in order to conserve memory.

Thus, in accordance with the first embodiment as described above, an control-point movement vector for the purpose of making weight variable is provided for each and every point on a character outline. The following effects are obtained as a result:

1. A change in weight can be calculated to be any thickness and in real time.

2. In comparison with a case in which interpolation is performed using outlines having two different weights, the quantity of data can be reduced by an amount commensurate with the number of existent control-points that do not have movement vectors.

3. In comparison with a case in which interpolation is performed using outlines having two different weights, it is unnecessary to perform calculations regarding control-points not having movement vectors. This raises conversion speed.

4. Since outline data is provided with a vector, data management is facilitated.

[Second Embodiment]

In the first embodiment, a case is described in which the movement vector of each control-point is represented by a primary expression. However, when a figure becomes more complex, vector data represented by a variety of functions appears. Depending upon the control-points, functions representing vector data include functions represented by primary expressions, functions represented by quadratic expressions, functions represented by polynomials, functions represented by trigonometric expressions and functions which change with weight serving as the boundary. Most commonly, since each control-point movement vector is represented by a polynomial, it is necessary to save the vector data of each control-point along with information for deriving the coefficients of the polynomial.

Accordingly, in the second embodiment, an outline forming apparatus will be described in which an control-point movement vector is possessed in the form of a curve of second degree or higher.

Figure 10:
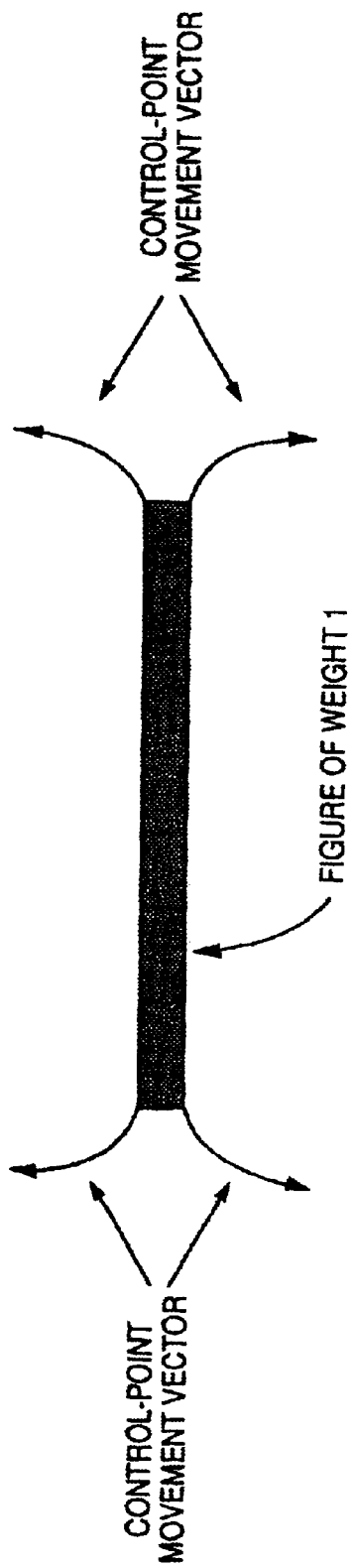
FIG. 10 is a diagram illustrating an example of an control-point movement vector represented by a curve.

FIG. 10 is a diagram illustrating an example of an control-point movement vector represented by a curve. This is an example in which an control-point movement vector for varying weight at each control-point is provided in the form of a primary straight line or curve of second degree (quadratic) or higher in the outline forming apparatus of FIG. 1. This means that the path of movement of each control-point with respect to weight is represented by a straight line or curve. For example, the kanji character "—" of Gothic type is such that each control-point widens in the X direction as the weight becomes heavier (bolder), though the amount of movement of each control-point does not have a fixed ratio with respect to movement in the Y direction. In this case, a path nearer to the original path is expressed by representing the path using a curve of second degree or higher.

FIG. 11 is a table showing the composition of outline data in the second embodiment. Here a flag 1 is a flag representing the start/end of an outline; a flag 2 is a flag representing the attribute of an outline; a flag 3 is a flag representing the degree of a function in the X direction in the path of control-point movement; and a flag 4 is a flag representing the degree of a function in the Y direction in the path of control-point movement. In the flag 2, STR-LINE, ST-C, INT-C and EN-C stand for "straight line", "start of curve", "intermediate point of curve" and "end of curve" respectively. When the flag 3 is 0, this represents that the coordinate value in the X direction does not change with respect to a change in weight. When the flag 3 is 1, this represents that the coordinate value in the X direction varies in the manner of a primary function, i.e., linearly, with respect to a change in weight. When the flag 3 is 2, this represents that the coordinate value in the X direction varies in the manner of a quadratic function, i.e., curvilinearly, with respect to a change in weight. Similarly, when the flag 3 is 3 or greater, motion along a more complicated curve can be expressed. The flag 4 represents meanings equivalent to those of the flag 3 with regard to the Y direction. With regard to each control-point, the coordinates of a point conforming to the degree of the control-point are arrayed in the order of the corresponding weight. In other words, as points describing a path expressed in the first degree, the coordinates of one point are stored with the exception of the control-point. In case of the second degree, the coordinates of two points are stored with the exception of the control point. Vector-x components 1, 2, . . . (VEC-X1, 2, . . . ) are stored in dependence upon the degree of the movement vector of each control point. These are used in obtaining a calculation equation of the vector at each control point.

In this embodiment, the amount of movement of an control point at weight 10 is stored at the vector-x component 1 (VEC-X1) and vector-Y component 1 (VEC-Y1) Further, the amount of movement of an control point at weight 5 is stored at the vector-x component 2 (VEC-X2) and vector-Y component 2 (VEC-Y2), and the amount of movement of an control point at weight 3 is stored at the vector-x component 3 (VEC-X3) and vector-Y component 3 (VEC-Y3).

Figure 12:
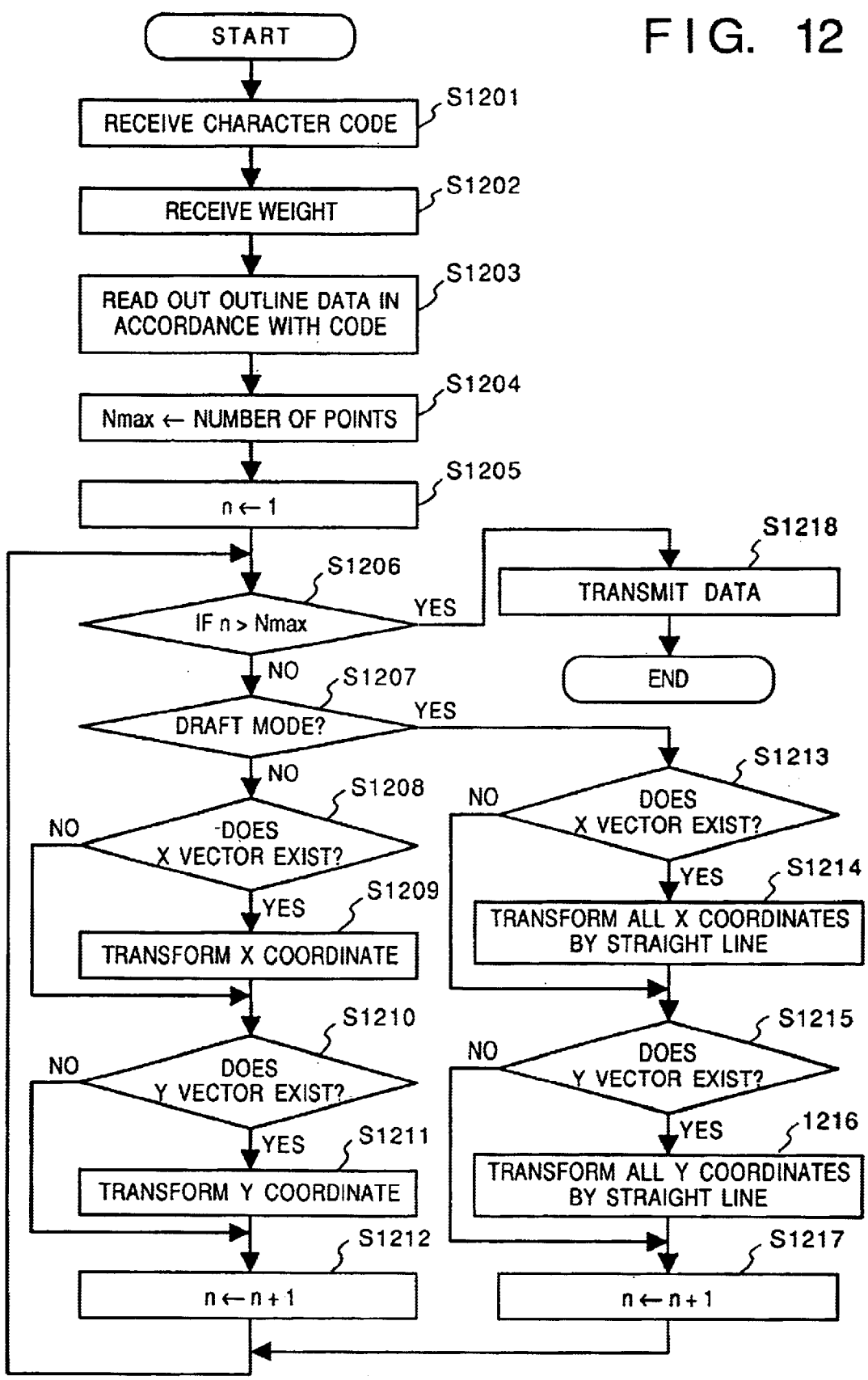
FIG. 12 is a flowchart showing a procedure for calculating and outputting character outline data of a desired weight from the outline data having the format of FIG. 11.
Figure 13A:
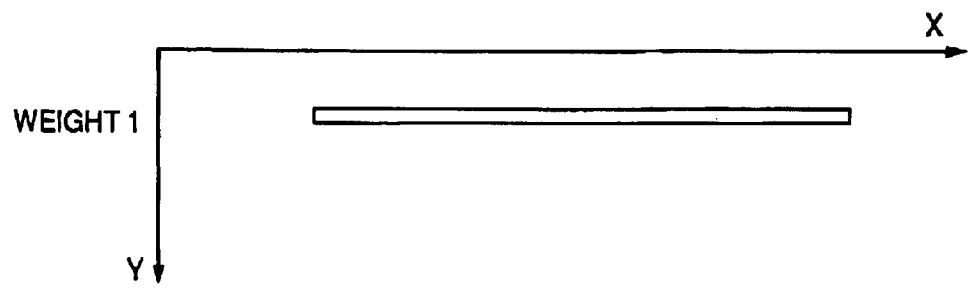
FIG. 13 is a diagram showing the manner in which a non-linear vector is fetched from outline data having three or more weights.
Figure 13B:
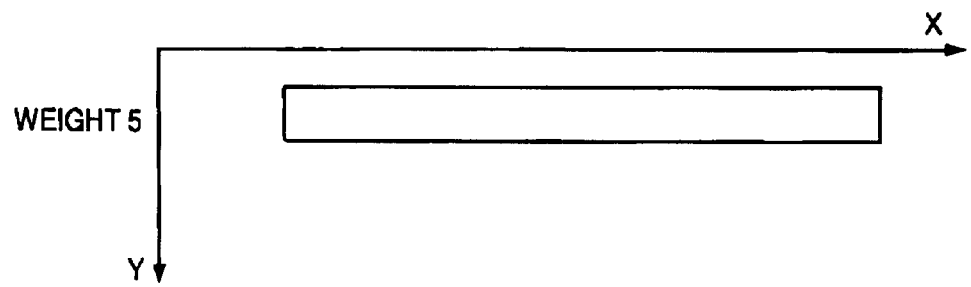
Figure 13C:
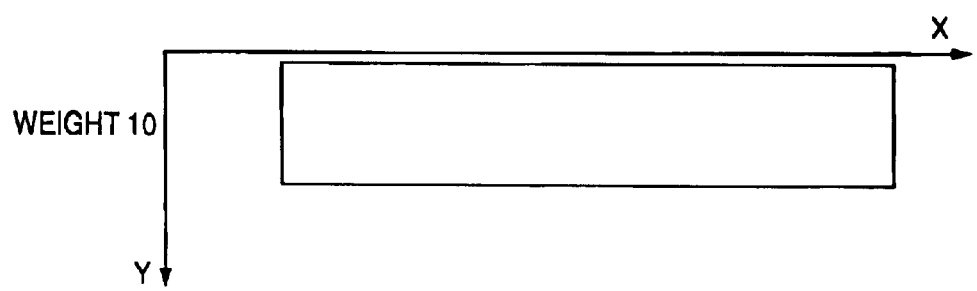
Figure 13D:
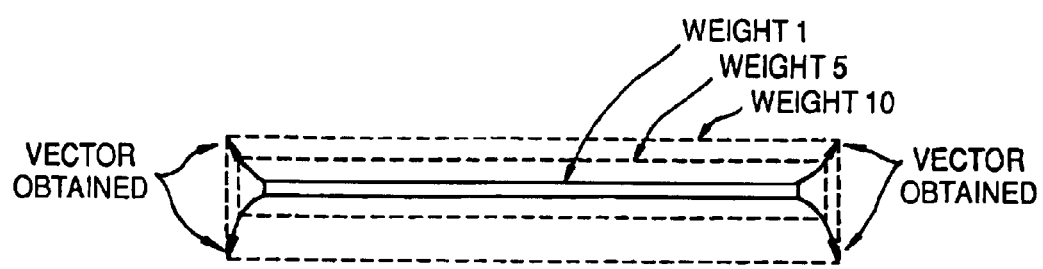

FIG. 12 is a flowchart showing a procedure for calculating and outputting character outline data of a desired weight from the outline data having the format of FIG. 11. A draft mode referred to in step S1207 represents an output mode which gives priority to speed over character quality. In order to approximate the paths of movement of all control points by a primary expression in the draft mode, computation is performed on the assumption that an control point with respect to a desired weight exists on a straight line connecting a point on an outline of lightest weight (weight 1) and a point on an outline of boldest weight (weight 10). If the mode is not the draft mode, computation in a degree based upon the outline data is performed to obtain the coordinates of the control points.

It should be noted that the changeover to the draft mode may be performed by designating the output mode from a host computer that transmits print data, or by designating the changeover using a control switch provided on the input unit 11. Further, with regard to selection of the output mode, the changeover may be made in dependence upon the output quality required, by way of example. If a low quality is designated, the draft mode is selected. Furthermore, a changeover may be made in dependence upon the speed required for generation of outline data. In this case, a changeover is made to the draft mode if high-speed generation is required.

First, at steps S1201 and S1201 in FIG. 12, the input unit 11 receives the character code of the character to be outputted and weight information that decides the weight of the character. Basic outline data is read out of the ROM 14 at step S1203 in accordance with the character code received at step S1201. Next, at step S1204, the number of control points having outline data read out of the ROM is substituted into Nmax. This is followed by step S1205, at which 1 is substituted into a counter variable n. It is determined at step S1206 whether n has exceeded Nmax. The program proceeds to step S1218 if n exceeds Nmax and to step S1207 if it does not. It is determined at step S1207 whether the output mode of the image forming unit is the draft mode. The processing from step S1208 onward is executed if the output mode is not the draft mode, and the processing from step S1213 onward is executed if the output mode is the draft mode.

If the output mode is not the draft mode, it is determined at step S1208 whether the n-th control point possesses an control-point movement vector in the X direction. (If the flag 3 is not 0, then the control point has an control-point movement vector.) The program proceeds to step S1209 if the data has an control-point movement vector and to step S1209 if there is an control-point movement vector in the X direction. At step S1209, the X coordinate of the control point is calculated from the weight information and vector data of the control-point movement vector. The equation for calculation the path of movement of an control point at this time is decided using the degree of the curvilinear expression and the vector-x components 1, 2, . . . stored at flag 3. For example, if the degree of a curve is 2, then the vector-x components 1 and 2 are used. The Y coordinate of the control point is obtained similarly at steps S1210 and S1212. After n is incremented, the program returns to step S1206 so that the foregoing processing is repeated for the next control point. When this processing ends for all control points, the program proceeds from step S1206 to step S1218, where data is transmitted from the output unit 16. Processing is then terminated.

In a case where the output mode is the draft mode, the program proceeds from step S1207 to step S1213.

Here it is determined whether the n-th control point possesses an control-point movement vector in the X direction. The program proceeds to step S1214 if the data has an control-point movement vector. This is determined based upon whether the flag 3 is 0 or not. At step S1214, the equation for calculating the control-point movement vector from the X coordinates of control points of weights 1 and 10 is decided to be a primary expression and this is used to obtain the X coordinate of the control point having the desired weight. The X-coordinate values for which the weights are 1 and 10 are obtained from the X coordinates and vector-x components 1 in the outline data of FIG. 11. The Y coordinates also are obtained in through steps S1215 and A1216 by processing similar to that of steps S1213 and S1214 described above. Then, at step S1217, n is incremented and the program returns to step S1206.

FIG. 13 is a diagram showing the manner in which a non-linear vector is calculated from outline data having three or more weights. This is an example in which the vector of each control-point is obtained automatically by calculation. In this example, an control-point movement vector (represented by a quadratic expression) is obtained from weights 1, 5 and 10 of the kanji character "一". That is, there is obtained an control-point movement vector of a quadratic expression, in which the vector starts at an control-point of weight 1, passes through a point of weight 5 and ends at an control-point of weight 10. In this case, in accordance with the constitution of data of FIG. 11 described above, the X and Y coordinates represent the coordinates of the control-point of weight 1, and the vector-X, Y components indicate the coordinates of the control-point of weight 10 (actually the position relative to that of weight 1). Further, the vector-X, Y components 2 indicate the amount of movement of the control-point of weight 5. The vector-X, Y components 3 indicate the amount of movement of the control-point of weight 3.

It is possible to select whether data of a primary expression or data of a quadratic expression or higher is possessed in dependence upon memory capacity and the capability of the CPU. At this time it is easy to transform data of a quadratic expression or higher to data of a primary expression. However, in case of an approximation by an control-point movement vector of a primary expression, there are instances in which this leads to some decline in character quality in comparison with a case where use is made of an control-point movement vector of a quadratic expression.

In the second embodiment described above, there are two modes, namely the draft mode and the ordinary mode, available as output modes. However, this does not impose a limitation upon the invention. For example, three types of outputs modes may be provided, such as the ordinary mode, a draft mode 1 and a draft mode 2. In draft mode 1, the degrees of the expressions of the paths of movement of all control-points are made quadratic or lower. In draft mode 2, the degrees of the expressions of the paths of movement of all control-points are made primary or lower. These arrangements also may be realized with ease from the disclosure of this embodiment.

Since the degree of an expression of a path of movement differs depending upon the control-point, the number of items of vector data also differs. The degree of vector data in the X and Y directions is discriminated by flags 3 and 4, respectively. Accordingly, a portion for which no vector data exists can be stored in less memory space in order to conserve memory in dependence upon the degree of the vector data.

Thus, in accordance with the second embodiment as described above, a vector for the purpose of making weight variable is provided for each point on a character outline. The following effects are obtained as a result:

1. A change in weight of a higher quality can be performed.

2. A portion capable of being expressed by a straight line is expressed by a straight line, thereby making it possible to store data without increasing the amount of data that much.

3. It is possible to select whether to develop a character by curves at a high quality or by straight lines at high speed.

4. Data management is easier than in a case where plural items of data are provided.

[Third Embodiment]

In a third embodiment of the invention, an outline forming apparatus will be described in which an control-point movement vector is obtained from one control-point and this control-point movement vector is used to obtain the coordinates of an control-point for each weight. The configuration of the outline forming apparatus according to the third embodiment is similar to that of the first embodiment and need not be described again.

Figure 14:
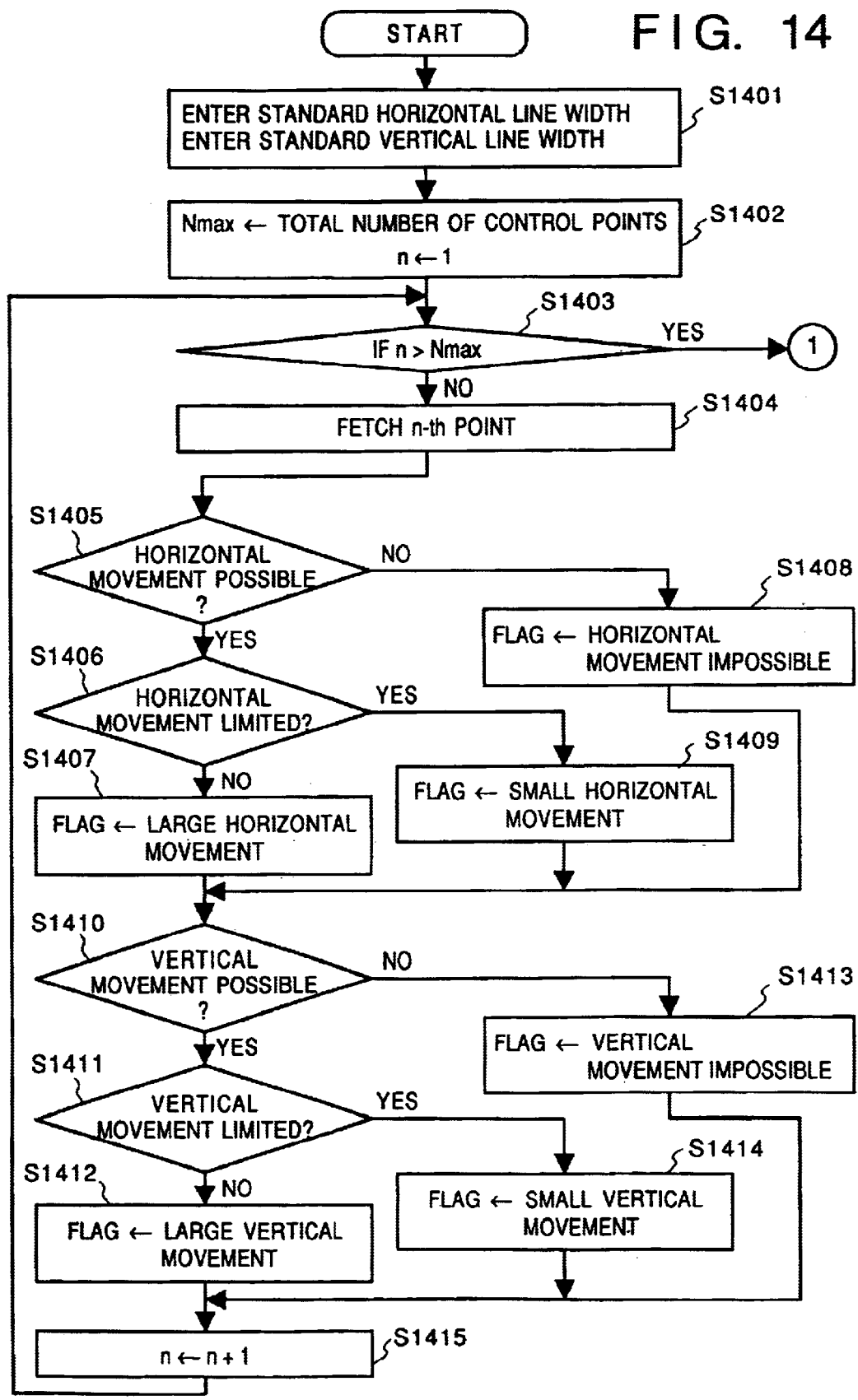
FIG. 14 is a flowchart showing a procedure for obtaining an control-point movement vector for each control-point in an outline forming apparatus according to a third embodiment of the invention.
Figure 15:
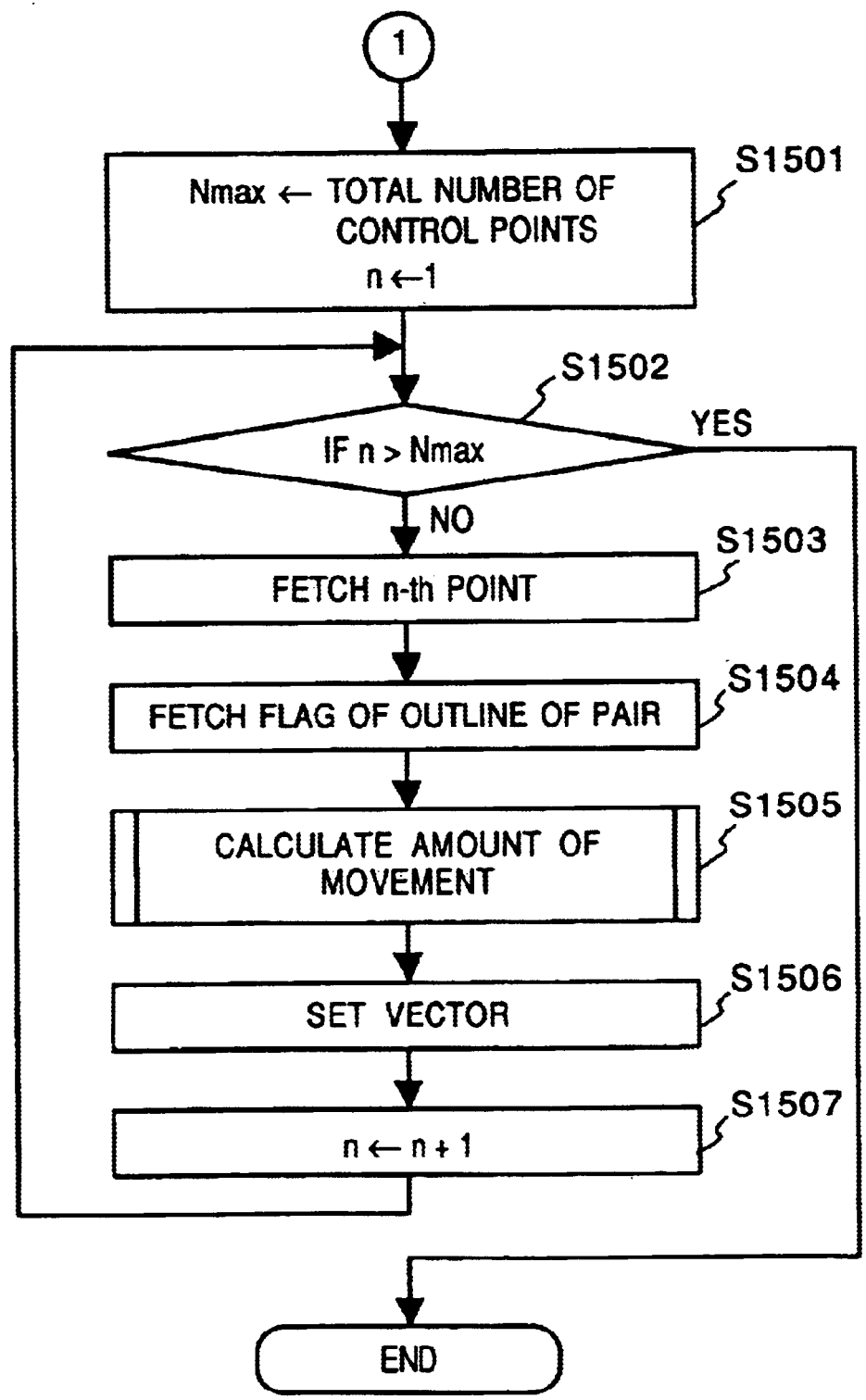
FIG. 15 is a flowchart showing a procedure for obtaining an control-point movement vector for each control-point in an outline forming apparatus according to the third embodiment.
Figure 16:
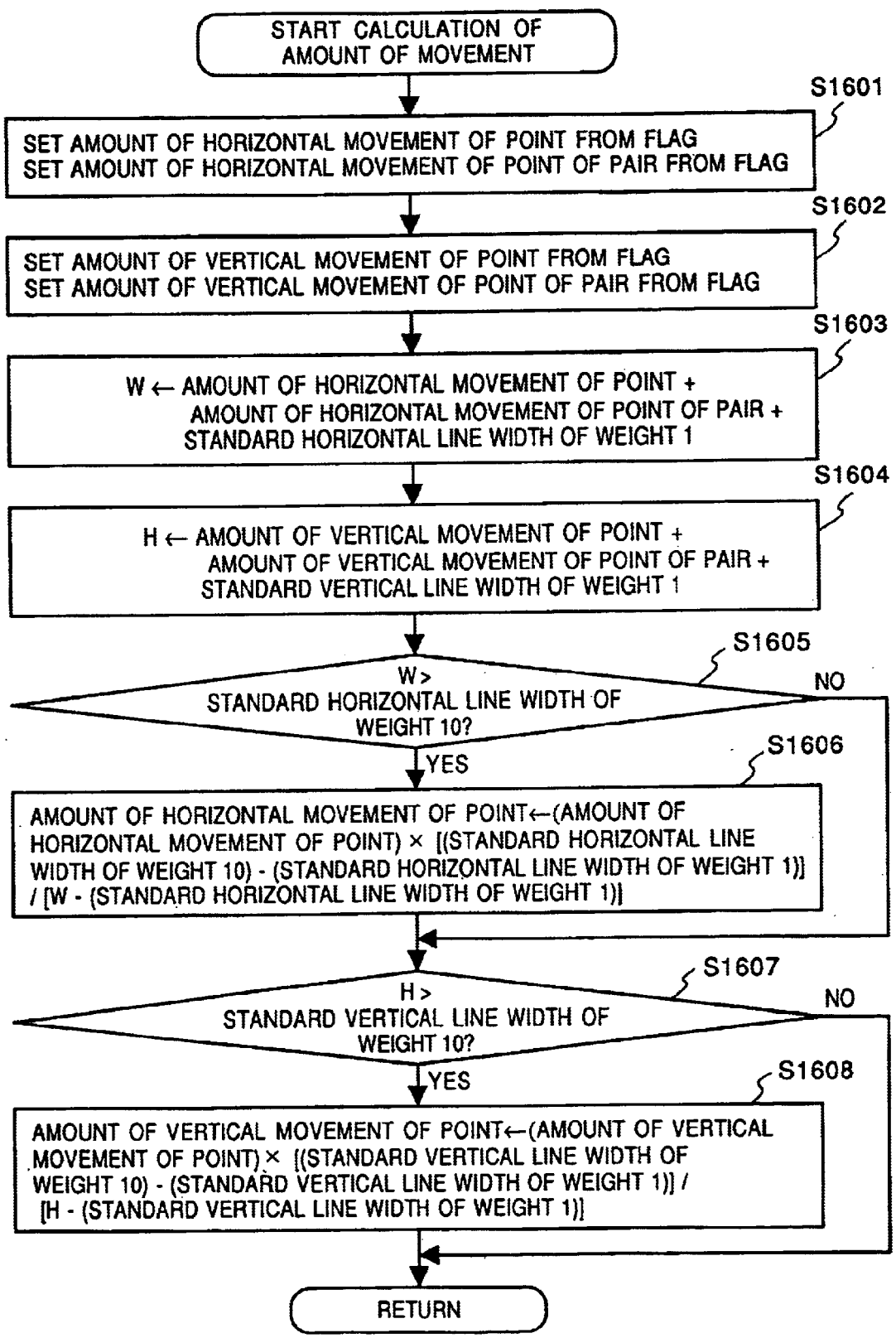
FIG. 16 is a flowchart showing a procedure for obtaining an control-point movement vector for each control-point in an outline forming apparatus according to the third embodiment.

FIGS. 14, 15 and 16 are flowcharts showing a procedure for obtaining an control-point movement vector for each control-point. Since an control-point movement vector can be obtained from a character having a weight of only one type, the quantity of outline data is reduced and management is easier in comparison with the case in which a vector is obtained from weights of two types or more, as shown in FIG. 9.

In the procedure of flowchart shown in FIG. 14, there are three types of horizontal movement of each control-point, which accompanies a change in weight, from the position of control-points of weight 1, namely impossible horizontal movement, horizontal movement with limitations and horizontal movement with no limitations.

The type of movement can be derived from the positional relationship between outline vectors forming a pair and another outline or character frame (body frame). For example, when an control-point is moved horizontally in a direction opposite an outline vector of a pair by an amount equivalent to the difference between a standard horizontal line width when the weight is made 10 and a standard horizontal line width when the weight is made 1, this control-point may or may not contact or intersect another outline or may or may not emerge from the body frame of the character. Therefore, the possibility of movement is set to a flag. A similar determination is performed with regard to the vertical direction. It should be noted that outline vectors forming a pair will be described later with reference to FIGS. 22 and 23.

In this embodiment, the standard horizontal line width and standard vertical line width when weight is 1 and when weight is 10 are entered at step S1401. It is assumed that these standard horizontal and vertical line widths have been stored in the ROM 14 beforehand in dependence upon each font. Next, the total number of control-points is substituted into Nmax and the counter variable n indicating the counted value of control-points is set to 1 at step S1402. It should be noted that the total number of control-points Nmax and counter variable n are stored in the RAM 15, just as in the first embodiment. It is determined at step S1403 whether n is greater then Nmax. The program proceeds to step S1501 (FIG. 15) if n is greater and to step S1404 is n is equal to or less than Nmax. The n-th control-point is fetched at step S1404.

It is determined at step S1405 whether the n-th fetched control-point is capable of moving in the horizontal direction. The program proceeds to step S1408 if movement is impossible and to step S1406 if movement is possible. It is determined at step S1406 whether movement in the horizontal direction is limited or not. The program proceeds to step S1409 if movement is limited and to step S1407 if movement is not limited. Since there is no limitation upon horizontal movement of the control-point at step S1407, a flag indicating that amount of horizontal movement of the control-point is large is set. If it is found at step S1405 that horizontal movement is not possible, a flag indicating that horizontal movement is impossible is set at step S1408. If it is found at step S1406 that horizontal movement is limited, a flag indicating that amount of horizontal movement of the control-point is small is set at step S1409.

Next, amount of movement with regard to the vertical direction is checked from step S1410 onward. It is determined at step S1410 whether the n-th fetched control-point is capable of moving in the vertical direction. The program proceeds to step S1413 if movement is impossible and to step S1411 if movement is possible. It is determined at step S1411 whether movement in the vertical direction is limited or not. The program proceeds to step S1414 if movement is limited and to step S1412 if movement is not limited. Since there is no limitation upon vertical movement of the control-point at step S1412, a flag indicating that amount of vertical movement of the control-point is large is set. If it is found at step S1410 that vertical movement is not possible, a flag indicating that vertical movement is impossible is set at step S1413. If it is found at step S1411 that vertical movement is limited, a flag indicating that amount of vertical movement of the control-point is small is set at step S1414.

The control-point counter n is incremented at step S1415, after which the program returns to step S1403. Thus, when flags indicating the amount of movement are set for all control-points, control proceeds from step S1403 to step S1501.

The amount of movement of each control-point is obtained from the flags representing the classification of amounts of movement of all of the control-points thus obtained. FIG. 15 illustrates the procedure for obtaining the amount of movement. In the calculation of amount of movement, a vector is calculated in such a manner that the necessary thickness is obtained in conformity with the control-point that forms a pair of control-points. To this end, a subroutine for calculating amount of movement is called together with a flag of a point whose amount of movement is calculated and a flag of the control-point of the pair.

The flowchart of FIG. 15 will now be described. At step S1501, the total number of control-points is substituted into Nmax and the control-point counter n is set to 1. It is determined at step S1502 whether n is greater than Nmax. Processing is terminated if n is greater. If n is equal to or less than Nmax, the program proceeds to step S1503.

Here the n-th control-point is fetched, after which the control-point forming the pair with the n-th control-point is fetched at step S1504. The control-point forming the pair is an control-point that decides width in the vertical or horizontal direction with regard to the n-th control-point. With respect to one control-point, two control-points are fetched, namely an control-point forming a pair in the horizontal direction and an control-point forming a pair in the vertical direction, and flags representing the respective amounts of movement are fetched. The amounts of movement are calculated at step S1505. Here amounts of movement in the horizontal and vertical directions of an control-point in a case where there is a change from weight 1 to weight 10 are obtained. Therefore, these are set as the vector-x component and vector-Y component of each control-point at step S1506. A method of obtaining the position of an control-point with regard to each weight using the vector-x component and vector-Y component is the same as in the first embodiment. This need not be described again.

FIG. 16 is a subroutine for calculating amount of movement. This is a flowchart representing the details of processing of step S1505 in FIG. 15. It should be noted that amount of movement is determined in advance by the type of a large/small horizontal movement flag or large/small vertical movement flag. Amount of movement is calculated from the flags of the pair of control-points and the standard line thickness. For example, in the case of a large amount of movement, the difference with respect to the standard horizontal line width is adopted at the amount of movement. In the case of a small amount of movement, half of this amount is adopted as the amount of movement.

First, at step S1601 in FIG. 16, the amount of horizontal movement of the control-point is set by a flag, which represents the amount of movement, set by the flowchart of FIG. 14. Further, the amount of horizontal movement of an control-point forming the pair in the horizontal direction fetched at step S1503 is set in accordance with a flag representing amount of movement. At step S1602, the amount of vertical movement of the control-point is set by a flag representing the amount of movement set by the flowchart of FIG. 14. Furthermore, the amount of vertical movement of the control-point forming the pair in the vertical direction fetched at step S1503 is set based upon a flag representing amount of movement.

This is followed by step S1603, at which the amount of horizontal movement of the control-point of interest, the amount of horizontal movement of the control-point forming the pair with this control-point in the horizontal direction and the standard horizontal line width at weight 1 are added together and substituted into W. Similarly, the amount of vertical movement of the control-point of interest, the amount of vertical movement of the control-point forming the pair with this control-point in the vertical direction and the standard vertical line width at weight 1 are added together and substituted into H at step S1604.

The value of W obtained at step S1603 is compared with the standard horizontal line width of weight 10 at step S1605. If W is larger, this means that the horizontal line width is too thick. Therefore, the amount of movement is corrected at step S1606. More specifically, the amount of horizontal movement of the control-point set at step S1601 is multiplied by

[(standard horizontal line width of weight 10)−(standard horizontal line width of weight 1)]/[W−(standard horizontal line width of weight 1)]

whereby the horizontal line width of weight 10 is corrected so as not to exceed the standard horizontal line width. If W if found to be equal to or less than the standard horizontal line width of weight 10 at step S1605, then the amount of horizontal movement set at step S1601 is used as is.

Processing similar to that of steps S1605 and S1606 described above is performed with regard to the vertical direction at steps S1607 and S1608. Thus, the amount of movement (position) of each control-point of weight 10 is calculated. Therefore, an control-point movement vector can be obtained through a technique similar to that of the first embodiment by using this amount of movement.

Figure 23:
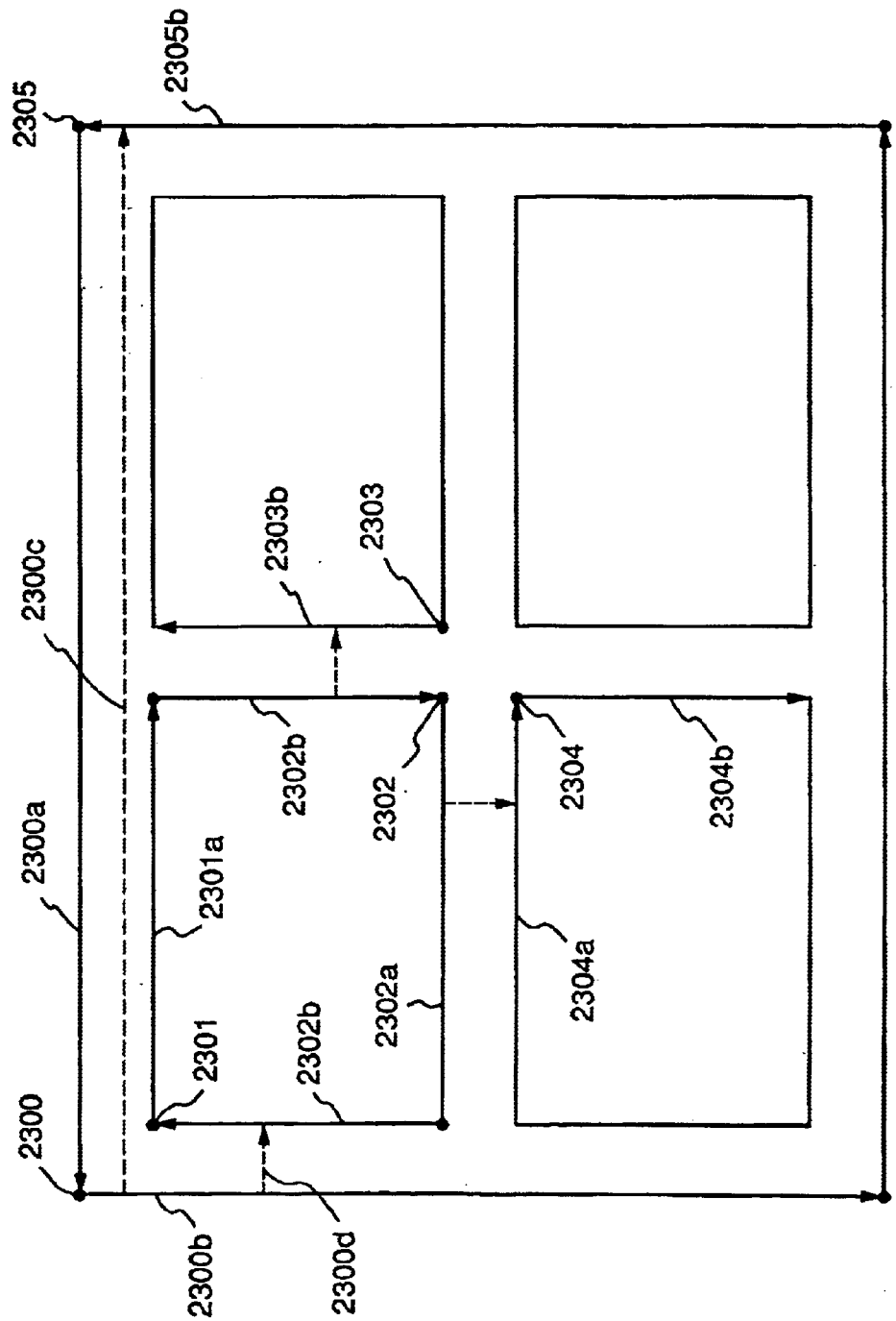
FIG. 23 is a diagram for describing a procedure for fetching an control-point forming a pair with an control-point of interest.

There are various methods of fetching an control-point forming a pair of control-points at step S1504 in FIG. 15. One example of such a method will be described with reference to FIGS. 22 and 23. FIG. 22 is a flowchart showing a procedure for extracting an control-point forming a pair with an control-point of interest, and FIG. 23 is a diagram for describing a procedure for extracting an control-point forming a pair with an control-point of interest.

First, at step S2201, an outline vector whose starting point is the control-point of interest is extracted. Similarly, an outline vector whose end point is the control-point of interest is extracted at step S2202. Accordingly, the outline vector is so arranged that the inner side of the outline will always be on the left side with respect to the direction of the vector. At steps S2201 and S2202 described above, an outline vector 2300b whose starting point is an control-point 2300 in FIG. 23 and an outline vector 2300a whose end point is the control-point 2300 are extracted, by way of example.

Next, at step S2203, scanning is performed horizontally to the left side of the direction of the extracted outline vector and an outline vector forming a pair is retrieved. This will be described with reference to FIG. 23. When an outline vector is retrieved along the horizontal direction, e.g., a scanning line 2300c, from the outline vector 2300b, an outline vector 2305b is extracted as the vector of the pair. Further, when an outline vector is retrieved along a scanning line 2300d, an outline vector 2302b is extracted.

It is determined at step S2204 whether the extracted vector of the pair is plural or not. The program proceeds to step S2205 if it is not plural and to step S2204 if it is plural. Step S2205 calls for the extracting of a vector of a pair at a position nearest, in the horizontal direction, to the outline vector containing the control-point of interest. That is, with reference to FIG. 23, the outline vector 2302b is nearer than the outline vector 2305b, and therefore this is adopted as the vector of the pair.

Of the two end points of the outline vector thus extracted, that nearest to the control-point of interest is adopted as the control-point forming the pair. That is, with reference to FIG. 23, of the two end points of the outline vector 2302b, the end point nearest the control-point 2300 is control-point 2301. Therefore, this point is adopted as the control-point forming the pair in the horizontal direction.

The processing of steps S2207 through S2210 is for performing scanning in the vertical direction to obtain the control-point forming a pair in the vertical direction. This processing is similar to that for the horizontal direction set forth above and need not be described again. In FIG. 23, an control-point 2301 is obtained as the control-point forming the pair, in the vertical direction, with the control-point 2300. Further, if the foregoing processing is executed with regard to an control-point 2302, for example, it will be understood that an control-point 2303 is extracted as an control-point forming a pair in the horizontal direction, and that an control-point 2304 is extracted as an control-point forming a pair in the vertical direction.

In the third embodiment as described above, it is possible to automatically calculate, from one type of weight, a vector for moving an control-point in accordance with weight with regard to each point on a character outline. This provides the following effects:

1. Since a vector for creating a different weight from one type of weight can be calculated, the process for designing characters is shortened.

2. Data management is easier in comparison with a case in which a vector is calculated from plural items of outline information.

[Fourth Embodiment]

In the fourth embodiment, an control-point movement vector is obtained from an control-point of one type of weight in the same manner as described in the third embodiment. In the outline forming apparatus described below, however, amount of movement, which is decided by a combination of an amount-of-movement flag of a certain control-point and an amount-of-movement flag of an control-point forming a pair with the certain control-point, is provided beforehand in the form of a table. It should be noted that the construction of the image forming apparatus of the fourth embodiment is similar to that of the first embodiment and need not be described again.

Figure 17:
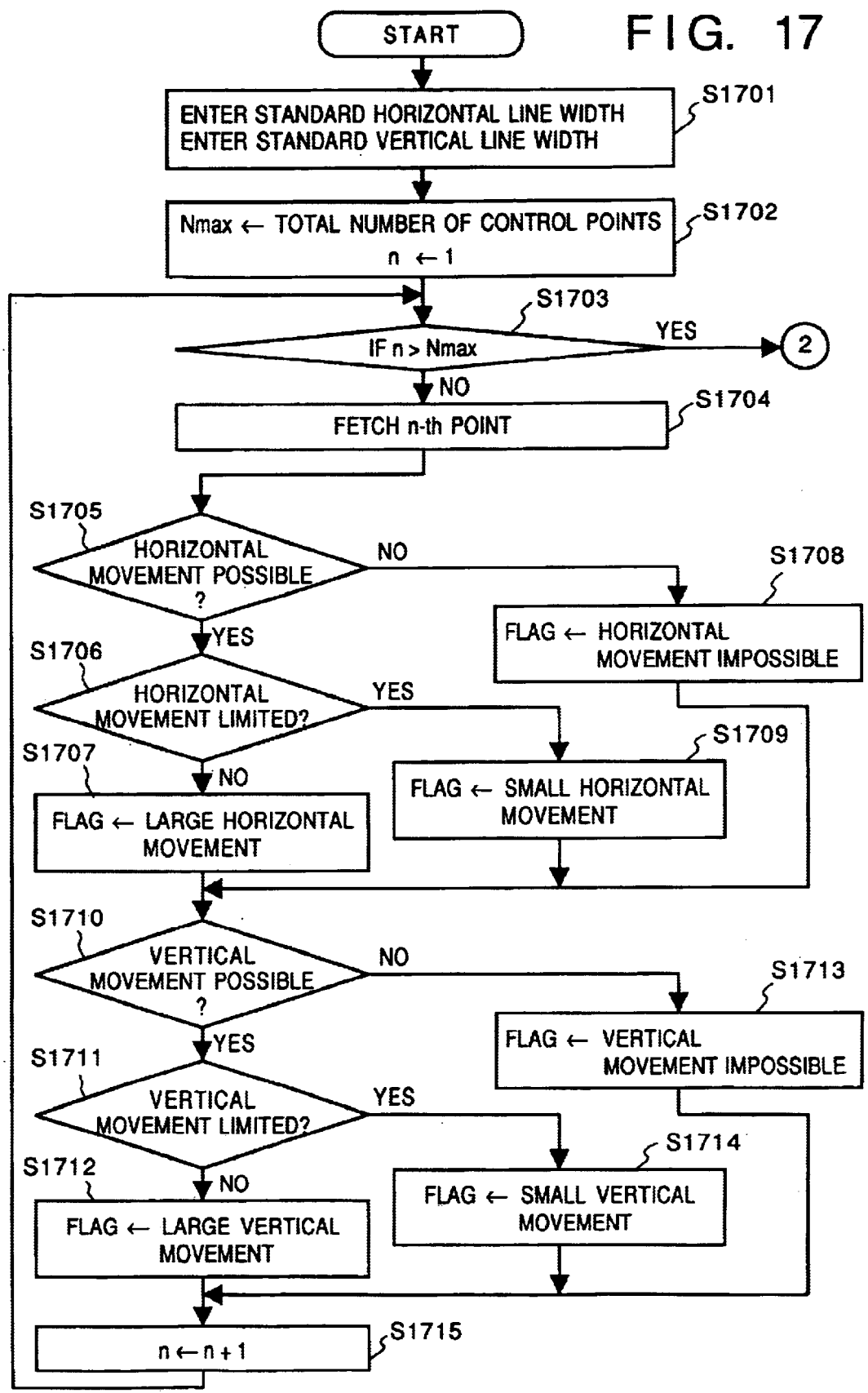
FIG. 17 is a flowchart showing a procedure for obtaining an control-point movement vector for each control-point in an outline forming apparatus according to a fourth embodiment.
Figure 18:
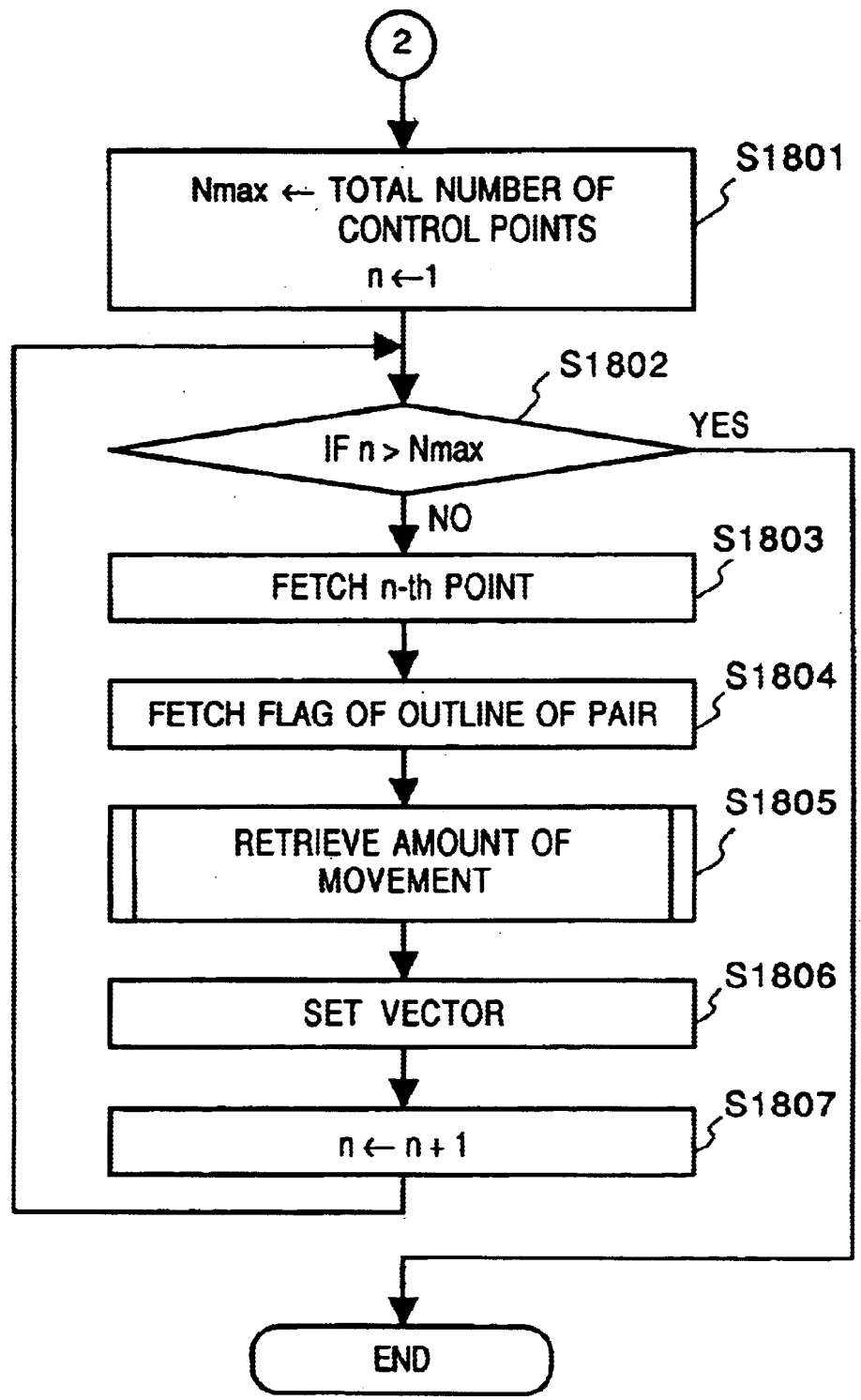
FIG. 18 is a flowchart showing a procedure for obtaining an control-point movement vector for each control-point in an outline forming apparatus according to the fourth embodiment.
Figure 19:
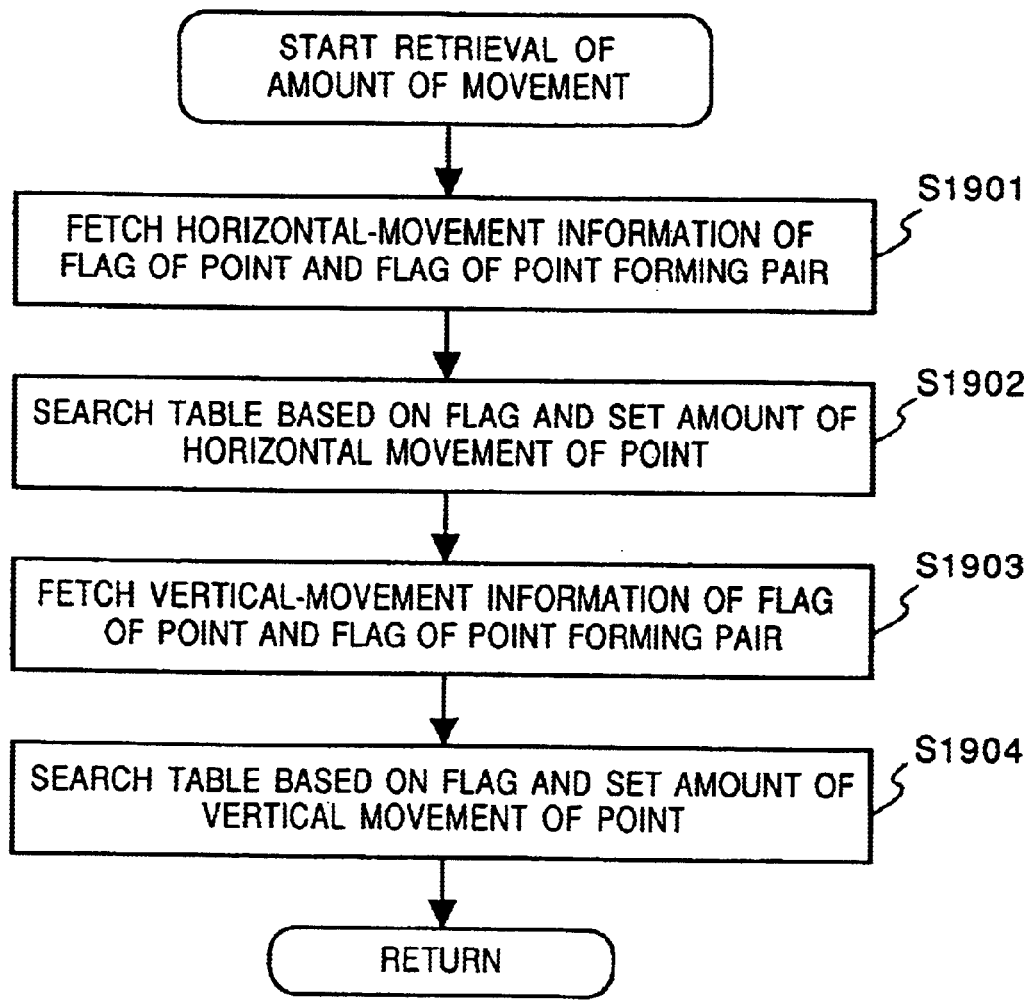
FIG. 19 is a flowchart showing a procedure for obtaining an control-point movement vector for each control-point in an outline forming apparatus according to the fourth embodiment.

FIGS. 17 through 19 are flowcharts illustrating a method of automatically obtaining data, which is used in the apparatus of the first embodiment, from the position of an control-point. By providing amount of movement in the form of a table, the amount of computation can be reduced in comparison with the method of the third embodiment, and it is also easier to improve quality by making the classification of the table finer.

In the flowchart of FIG. 17, there are three types of horizontal movement from the position of a point on a character outline, namely impossible horizontal movement, horizontal movement with limitations and horizontal movement with no limitations. The type of movement can be derived from the positional relationship between pairs of outline vectors and another outline or body frame. That is, when an control-point is moved horizontally in a direction opposite an outline vector of a pair by an amount equivalent to the difference between a standard horizontal line width when the weight is made 10 and a standard horizontal line width when the weight is made 1, this control-point may or may not contact or intersect another outline or may or may not emerge from the body frame of the character. Therefore, the possibility of movement is set to a flag. A similar determination is performed with regard to the vertical direction.

In order to make the classification of the possibility of movement finer, classification is made based upon whether movement is impossible (the control-point intersects another outline or emerges from the body frame) when the control-point is moved a certain percent of the difference between the standard horizontal line widths of weights 1 and 10.

Steps S1701 to S1715 in the flowchart of FIG. 17 are similar to steps S1401 to S1415 in the flowchart of FIG. 14 and need not be described again. Actual amount of movement is obtained from the amount-of-movement flags of all control-points found from the flowchart of FIG. 17. FIG. 18 illustrates a technique for obtaining this amount of movement. In the calculation of amount of movement, amount of movement is fetched from a table based upon a combination of an amount-of-movement flag of an control-point and an amount-of-movement flag of an control-point forming a pair.

In FIG. 18, the steps from S1801 to 1807 with the exception of step S1805 are the same as steps S1501 to S1507 with the exception of step S1505 in FIG. 15. Step S1805 is processing for acquiring the absolute value of amount of movement using a horizontal-movement table and a vertical-movement table. The details are illustrated in FIG. 19.

FIG. 19 is a subroutine for calculating amount of movement. The horizontal-movement table and vertical-movement table used here can be changed depending upon the style of type and character. Finer adjustment of vectors is possible.

With reference to FIG. 19, a flag representing the amount of movement of an control-point of interest and a flag representing the amount of movement of an control-point forming a pair with this control-point in the horizontal direction are fetched at step S1901. Next, at step S1902, the flag representing the amount of movement of each control-point is used to search a horizontal-movement table of the kind illustrated in FIG. 20, and the absolute value of amount of movement in the horizontal direction is acquired. The direction of movement in a direction away from the control-point forming the pair is set. This is followed by step S1903, at which a flag representing the amount of movement of an control-point of interest and a flag representing the amount of movement of an control-point forming a pair with this control-point in the vertical direction are fetched at step S1901. Next, at step S1904, the flag representing the amount of movement of each control-point is used to search a vertical-movement table of the kind illustrated in FIG. 21, and the absolute value of amount of movement in the vertical direction is acquired. The direction of movement in a direction away from the control-point forming the pair is set.

Thus, the amount of movement of an control-point of weight 10 is obtained. Therefore, this is used to calculate an control-point movement vector so that the amount of movement of the control-point corresponding to each weight can be calculated.

FIGS. 20, 21 are tables used in retrieving the amounts of movement of FIG. 19. FIG. 20 is a table for amount of horizontal movement, and FIG. 21 is a table for amount of vertical movement. The tables are searched based upon the combination of the amount-of-movement flag of an control-point and the amount-of-movement flag of the point forming the pair, the corresponding amount of movement is acquired and this is used in vector generation.

In the fourth embodiment as described above, an control-point movement vector for making weight variable is set for each point on a character outline based upon a single type of weight using one table. This provides the following effects:

1. Since a vector for creating a different weight from one type of weight can be calculated, the process for designing characters is shortened.

2. Data management is easier in comparison with a case in which a vector is calculated from plural items of outline information.

3. It is possible to create an control-point movement vector for developing, to a higher quality, the characters of a variety of fonts by providing a plurality of tables.

4. By making the conditions for judgment finer, it is possible to create a vector, which can be developed to a higher quality, from a character.

In the third and fourth embodiments described above, amounts of movement of control-points can be calculated in advance for all characters if there is enough memory capacity. By storing these amounts of movement in the format shown in FIG. 6, speed of processing can be raised (this will be described in the sixth embodiment).

In the third and fourth embodiments, paths of movement up to weight 10 are obtained based upon each control-point in the outline data of weight 1. However, this does not impose a limitation upon the invention. For example, an arrangement may be adopted in which path of movement to weight 1 is obtained based upon each control-point in outline data of weight 10 having a thick line width. Furthermore, by applying the embodiments 3 and 4, path of movement of an control-point can be obtained from any outline data of weights 2~9. For example, in a case where outline of weight 3 is used, a movement vector can be obtained through a procedure similar to that of the foregoing embodiment using the standard horizontal line width and standard vertical line width of weight 3 and the standard horizontal line width and standard vertical line width of weight 10.

Furthermore, though the standard horizontal line width and standard vertical line width of weights 1 and 10 used in the third and fourth embodiments are given for each and every font, an arrangement may be adopted in which these are given for every pattern.

Furthermore, in the horizontal-movement table (FIG. 20) and vertical-movement table (FIG. 21) used in the fourth embodiment described above, amount of movement is decided based upon the combination of flags of three types of movement. However, this does not impose a limitation upon the invention. An arrangement may be adopted in which the classification of amount of movement is made finer and use is made of a combination of flags of four or more types of amount of movement. Conversely, an arrangement may be adopted in which the classification of amount of movement is made coarser and use is made of a combination of flags of two types of amount of movement. Furthermore, by providing horizontal- and vertical-movement tables of a plurality of types having amount-of-movement classifications of different fineness, the fineness of classification of amount of movement can be changed over in dependence upon the generation speed and quality required when outline data is generated. In this case, though quality at the time of outline generation is improved as the amount of movement is classified more finely, processing time is prolonged.

[Fifth Embodiment]

In each of the foregoing embodiments, an control-point movement vector is represented by a single function and the position of an control-point for each weight is decided. In this embodiment, a case will be described in which the function of the movement vector of an control-point varies with a certain weight serving as the boundary.

FIG. 5 is a diagram showing examples in which a function representing an control-point movement vector is changed. In this example, at a point of interest, the function of the X coordinate varies with a weight of 4 serving as the boundary. More specifically, for weights of 4 or greater, the X coordinate no longer changes. The Y coordinate varies in accordance with a function of second degree or higher.

FIG. 24 is a table showing constitution of outline data in a fifth embodiment of the invention. In FIG. 24, flags 1 through 4, X, Y coordinates and each of the vector-X, Y components are the same as in FIG. 11 of the the second embodiment and these need not be described again. A flag 5 represents a weight value at which the function of a movement vector of an control-point in the X direction changes. A flag 6 represents a weight value at which the function of a movement vector of an control-point in the Y direction changes. By way of example, 4 is stored as the flag 5 at the point of interest. In a case where there is no change in the movement vector, 0 is stored. In a case where flag 5 or 6 is other than 0, the content indicated by each item of coordinate data in the next column changes. For example, in a case where 4 is stored as flag 5, the value prevailing when weight is 4 is stored as the X coordinate. The data used in a case where the weight value is 4 or greater is stored as flag 3 and the X coordinate.

Figure 26:
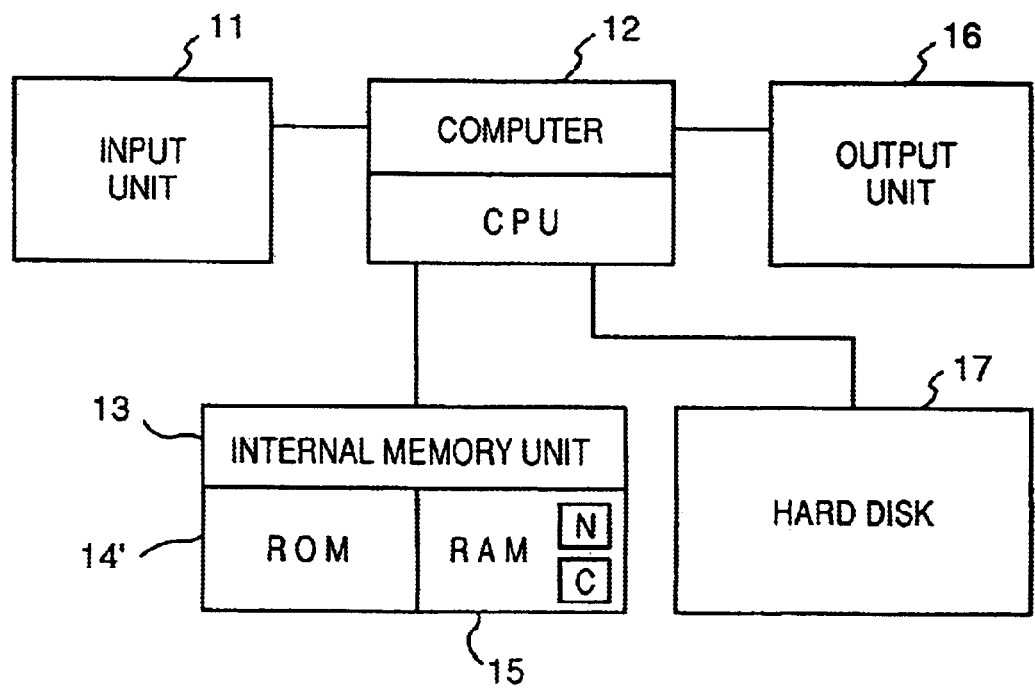
FIG. 26 is a block diagram showing the general control configuration of an outline forming apparatus according to a sixth embodiment of the invention.

More specifically, in a case where the function of the movement vector of an control-point changes with a certain weight value serving as the boundary, outline data is stored over a plurality of columns. For example, vector data for weights 1 through 4 is stored in the first column and vector data for weights 4 through 10 is stored in the second column. Furthermore, in a case where weight values for which a function changes are plural in number, it will suffice to store data in a third column and a fourth column accordingly. In the example of FIG. 24, at an control-point a, the function of the movement vector in the X direction varies at weight 4. At weights following 4, the flag of the second column is 0 and, hence, the X coordinate no longer varies. On the other hand, there is no change (flag 6 is not 0) in the movement vector of the control-point a in the Y direction. In this example, an arrangement may be adopted in which only the necessary data is stored in columns from the second column onward, as shown in FIG. 26.

At an control-point b, the function of the movement vector in the X direction changes at weight 5, and the function of the movement vector in the Y direction changes at weights 3 and 7. The function of the movement vector in the Y direction becomes a quadratic curve at weights 1~3 and a primary straight line at weights 4~7. There is no longer any changes at weights 8~10.

Figure 25:
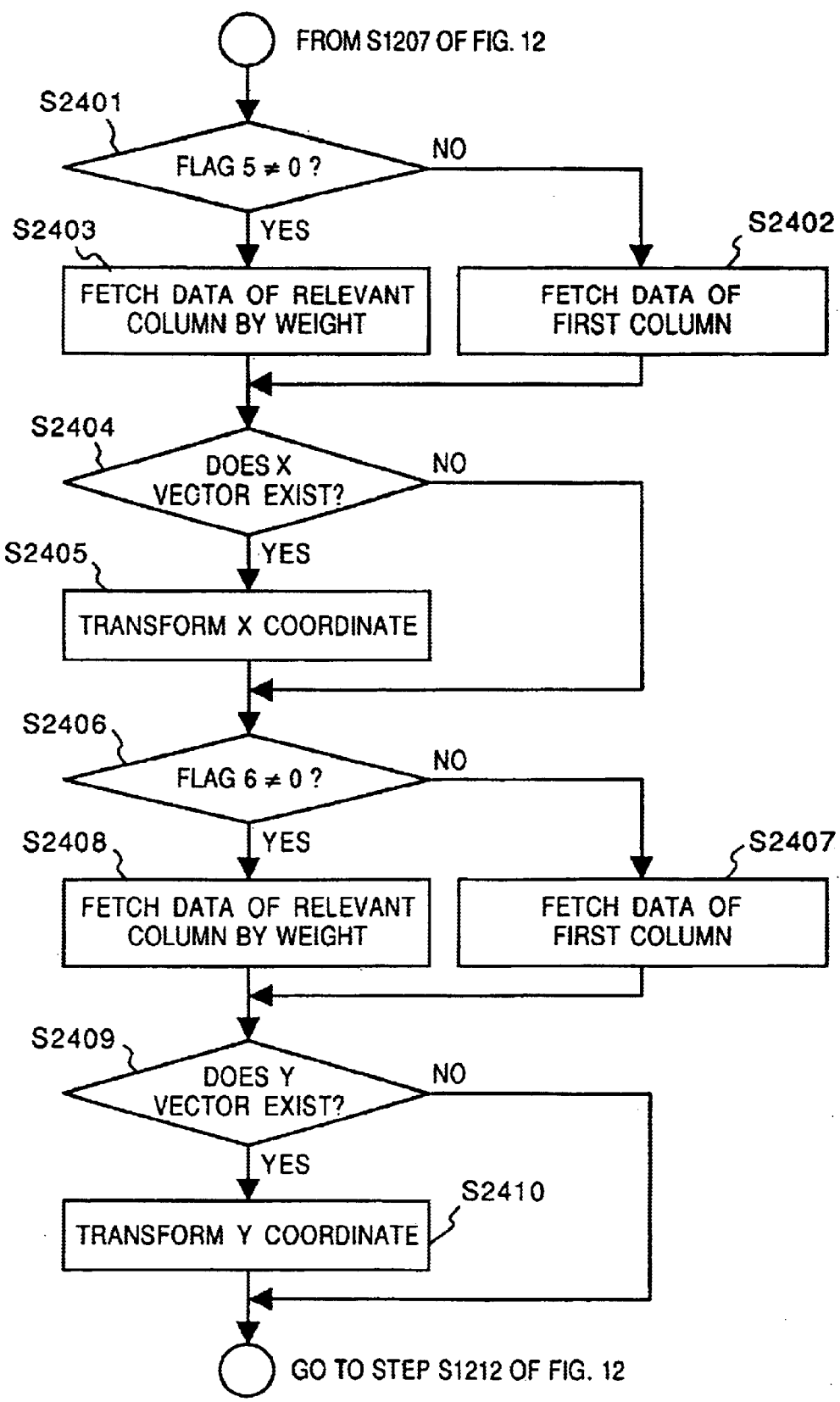
FIG. 25 is a flowchart showing a procedure for transformation of X, Y coordinates of an control-point according to the fifth embodiment.

FIG. 25 is a flowchart showing a procedure for transformation of X, Y coordinates of an control-point according to the fifth embodiment. It should be noted that the procedure for output of character-outline data in the fifth embodiment is substantially the same as that of the flowchart of FIG. 12 in the second embodiment; only the procedure for coordinate transformation is different. Accordingly, the flowchart of FIG. 25 illustrates only the portion corresponding to steps S1208 to S1211 of FIG. 12. Furthermore, the weight values each vector-x component and vector-Y component are stored separately in advance with regard to those for which the function changes.

It is determined at step S2401 whether the flag 5 is 0. If this flag is 0, the function does not change and therefore the program proceeds to step S2402, at which the data that has been stored in the first column of the relevant control-point is fetched. If flag 5 is not 0, then the program proceeds to step S2403. Here the column to be used is decided by the value of flag 5 in the first column and succeeding columns, and that data that has been stored in the relevant column is fetched. Processing for transformation of the X coordinate is executed using the data thus fetched at step S2402 or S2403. More specifically, at step S2404, the flag 3 is checked and it is determined whether the X vector exists. If the X vector exists, the program proceeds to step S2405, at which the X coordinate of the control-point is calculated from the weight information and the vector data of the control-point movement vector. The equation representing the path of movement of the control-point at this time is decided using the degree of the curvilinear expression stored in flag 3 and the vector-x components 1, 2, . . . .

Steps from S2406 to S2410 represent processing relating to the Y coordinate. These steps are similar to the steps S2410 to S2405 described above and need not be described again.

Thus, in accordance with the character-outline forming apparatus of this embodiment, it is possible to deal also with a case in which the function of the movement vector of an control-point changes with the weight value as the boundary.

[Sixth Embodiment]

The sixth embodiment of the invention relates to an outline-data memory apparatus for generating movement information of each control-point that makes it possible to generate characters of a plurality of weights from control-point data having one type of weight, and storing the movement information of each control-point together with position information of each control-point of the outline data.

In the outline-data memory apparatus according to the sixth embodiment, outline data having position information and weight information of each control-point stored in a memory medium is read out. For example, by reading out outline data of weights 1 and 10, the path of movement of each control-point from weight 1 to weight 10 is obtained as a primary function in which weight is a parameter, as shown in FIG. 9. Information for generating the primary function thus obtained is stored in a memory medium in the format of FIG. 6, for example, together with the position information of each control-point.

FIG. 26 is a block diagram showing the general control configuration of an outline forming apparatus according to the sixth embodiment of the invention. Blocks identical with those shown in FIG. 1 are designated by like reference numerals and need not be described again. Numeral 14' denotes a ROM storing outline data of a certain weight. The outline data is general outline data and does not contain movement information for dealing with other weights. Numeral 17 denotes a hard disk for storing outline data which contains an control-point movement vector generated based upon the outline data stored in the ROM 14'. That is, the outline-data memory apparatus of the sixth embodiment calculates movement-vector data of an control-point from the general outline data stored in the ROM 14 and stores the outline data having this movement-vector data in the hard disk 17.

Figure 27:
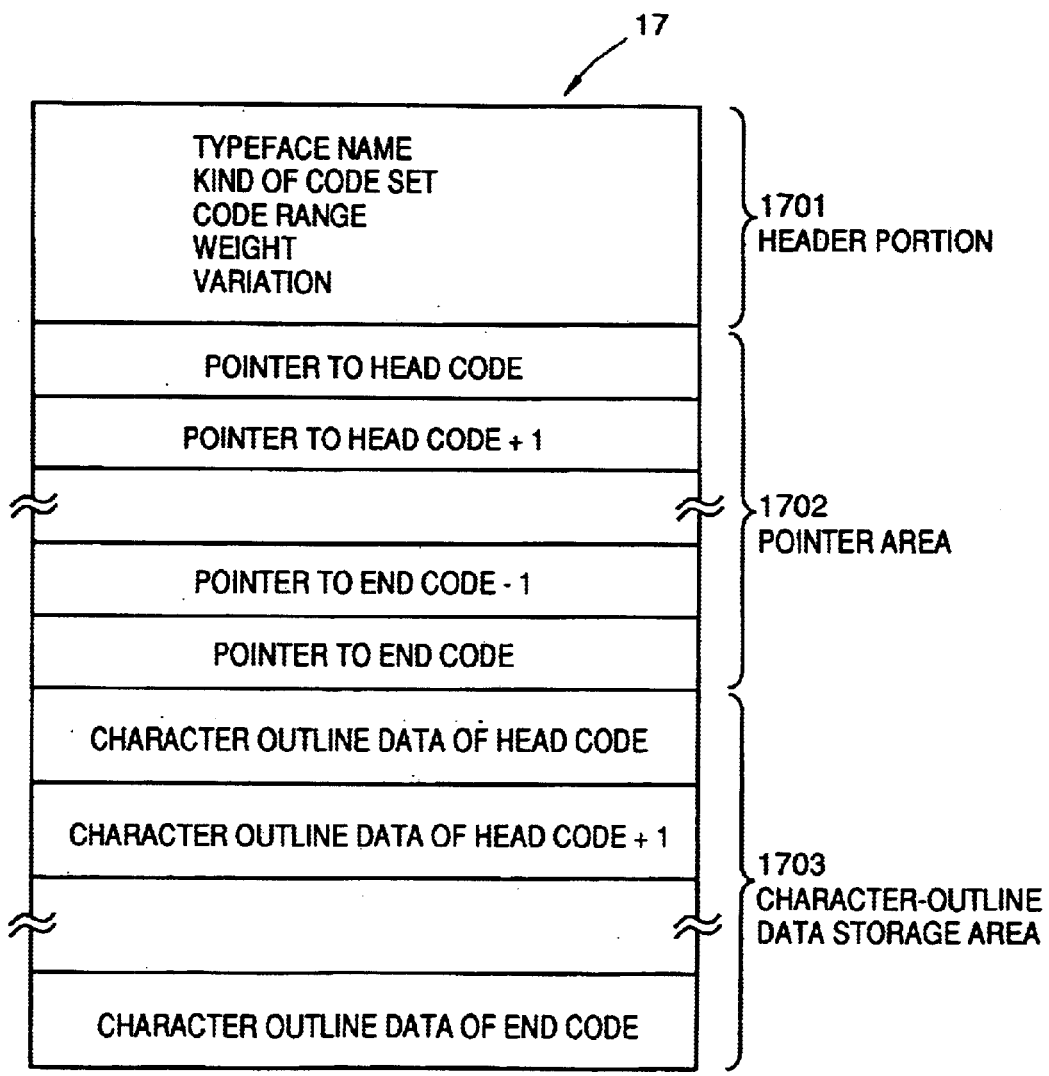
FIG. 27 is a diagram showing the data structure of outline data in a hard disk.

FIG. 27 is a diagram showing the data structure of outline data in the hard disk 17. Numeral 1701 denotes a header portion containing the "Typeface Name", "Character Arrangement (kind of Code Set)", "Range of Codes", "Weight" and "Variation" of the outline data. The "Typeface Name" represents the category (Gothic, Ming, etc.) of the style of type. "Character Arrangement" represents whether the arrangement is in conformity with a system such as ASCII, JIS0208, etc. For example, if it is in conformity with ASCII, then it is represented by a code such as 0x42; if it is in conformity with JIS0208, then it is represented by a code such as 0xC2. The "Range of Codes" is a range represented by the starting number (starting code) and end number (end code) of the allocated codes of the character. For example, each kanji character of JIS First Level is allocated a number in a range of 3021 (a hexadecimal number)–4F7E (a hexadecimal number). as a code. Accordingly, the head code is 3021 and the end code is 4F7E. "Weight" is a numerical value representing the thickness of the character. "Variation" represents the shape of the character, such as "Condensed", "Expanded", "Italic", etc.

Numeral 1702 denotes a pointer area for storing a pointer indicating the storage location of each item of character outline data. The pointer indicates the number of bytes of an offset from the beginning of the header portion to the address at which the outline data of each character has been stored. The number of pointers that exist is equivalent to the number of characters stored. For example, in case of a kanji character of the JIS First Level, the number of pointers is enough for (4F-30+1)×(7E-21+1)=3008 (according to the JIS, the two lower digits of a code number are used from 7E to 21). Accordingly, a "Pointer to Head Code" is an offset value for specifying an address at which outline data of the kanji of code number 3021 has been stored. Similarly, a "Pointer to End Code" is an offset value for specifying an address at which outline data of the kanji of code number 4F7E has been stored.

Numeral 1703 denotes an area for storing character outline data. The character outline data stored here is outline data containing information of an control-point movement vector generated using the outline data stored in the ROM 14'. The content of this data has been described in the first through fifth embodiments and need not be described again here.

The above-mentioned outline data is managed as a file in the hard disk 17. Data files (document files based upon document processing, etc.) created by various processing are stored in the hard disk 17. Whether or not a file is an outline-data file is managed and identified by a filename extension or information in a directory stored in the hard disk 17. If there are a large number of characters, it is possible to split one font into a plurality of files. At such time, the CPU 12 judges which file corresponds to which code of which font based upon the information (name of the style of type, character arrangement, code range, weight, version) registered in the header portion 1701.

Figure 28:
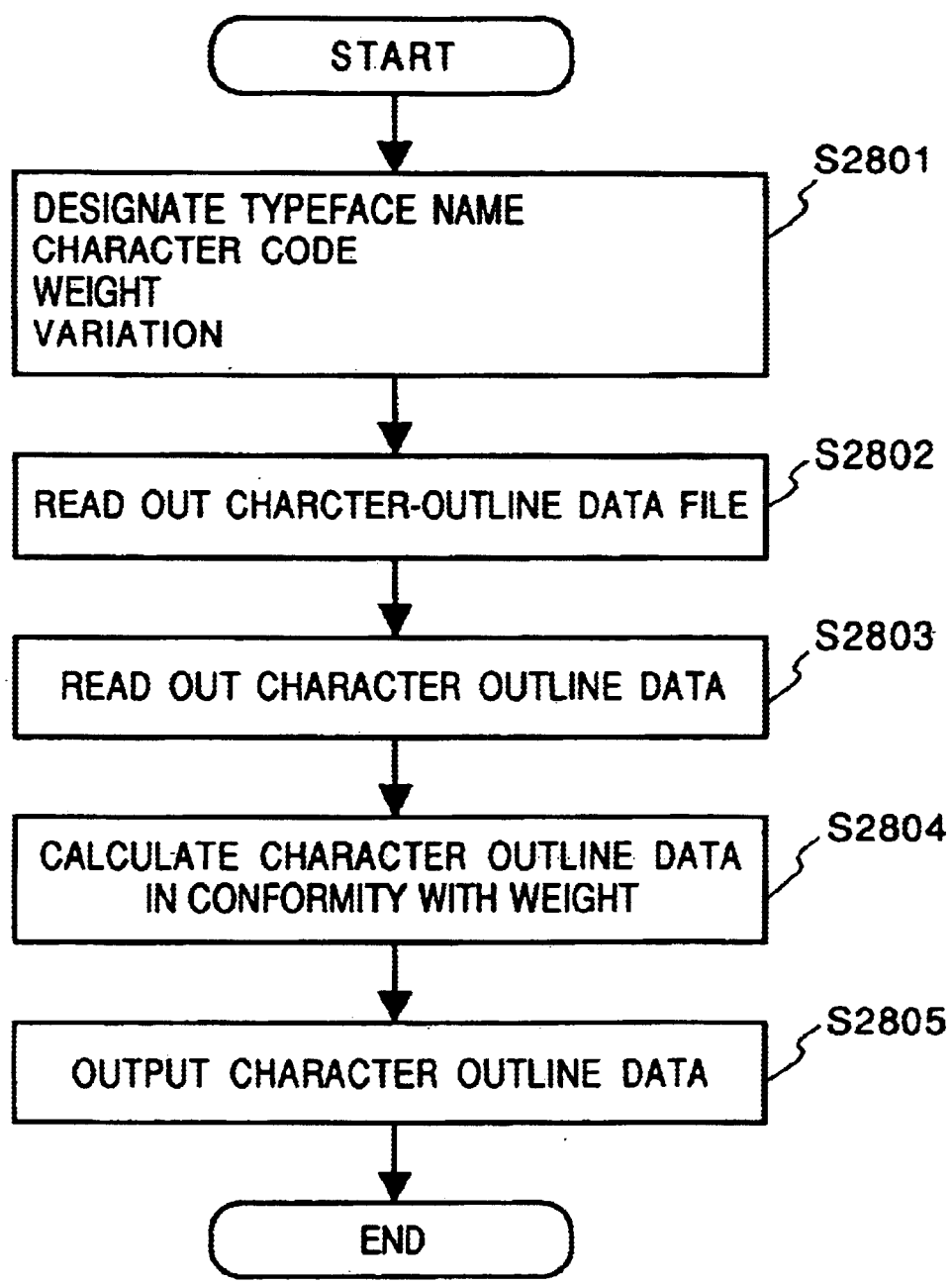
FIG. 28 is a flowchart showing a data output procedure in the sixth embodiment.

FIG. 28 is a flowchart showing a data output procedure according to the sixth embodiment. Information (name of the style of type, character arrangement, weight, version) for specifying the character-outline data file is entered at step S2801. Next, at step S2802, the information entered at step S2801 is compared with the header portion 1701 of each character-outline data file, the character-outline data file to be used is specified and the file is read out. Next, at step S2803, the character outline data corresponding to the relevant character code is read out based upon the character code entered at step S2801. This is followed by step S2804, at which the CPU 12 uses the movement-vector data to calculate the position of the character control-point that is in accordance with the weight specified. The procedure for generating the position of the control-point has been described in the first through fifth embodiments and need not be described again. The character outline data thus obtained is outputted from the output unit 16 at step S2805.

Figure 29:
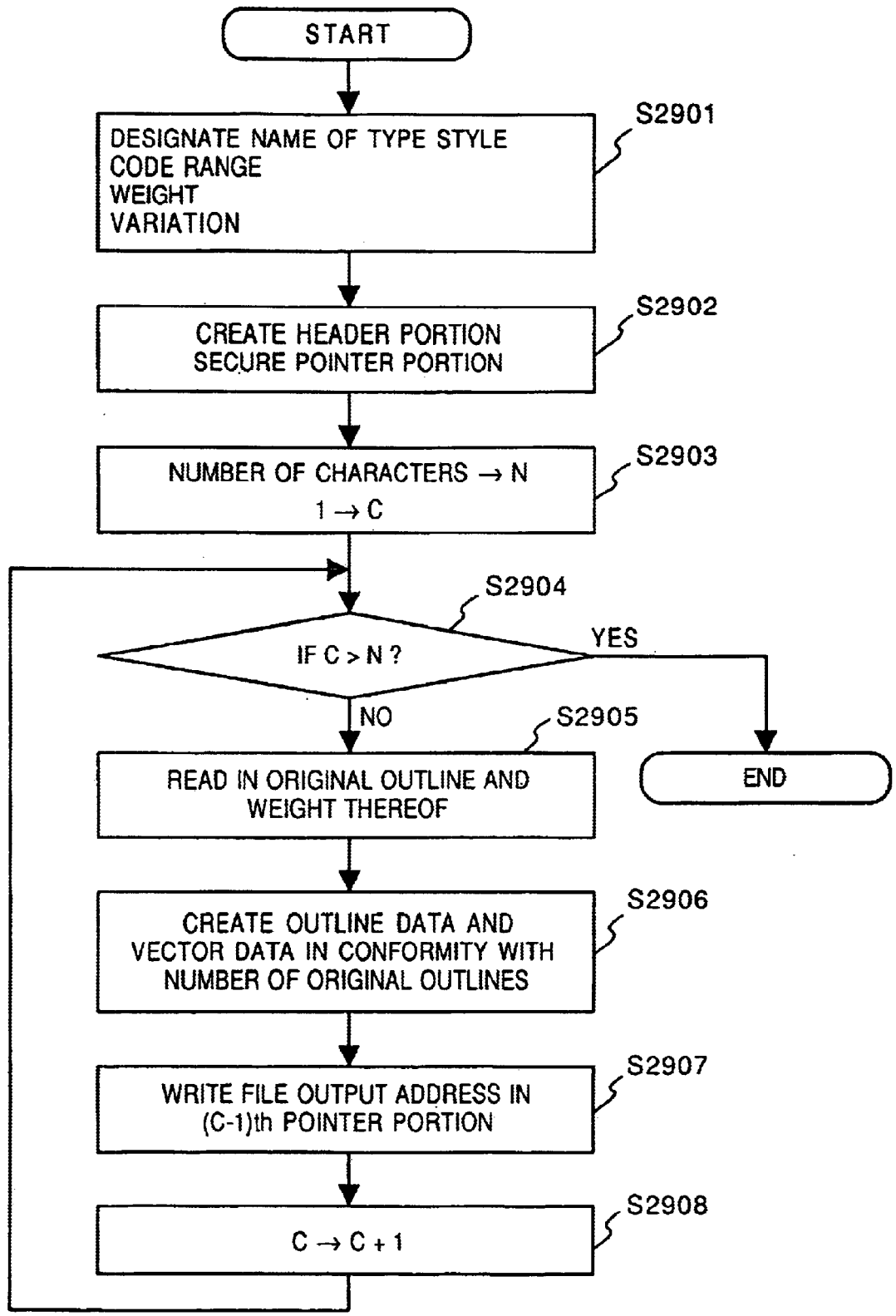
FIG. 29 is a flowchart showing a procedure for storing outline data in the sixth embodiment.

Described next will be a procedure for generating outline data having movement information from outline data (which will be referred to as original outline data below) not possessing information relating to an control-point movement vector, namely movement information, and storing the generated outline data in the hard disk 17. FIG. 29 is a flowchart illustrating a procedure for generating and storing outline data in the sixth embodiment.

Header information of outline data to be stored in a character-outline data file to be created is designated at step S2901. The header information is the information stored in the header portion 1701 of FIG. 27. Next, at step S2902, file output is performed based upon the set header information, the header portion 1701 is created and the pointer area 1702 is secured. Here the size of the pointer area 1702 is decided by the number of characters calculated based upon the range of codes in the header information. The number of characters is substituted into the variable N and 1 is substituted into a count C at step S2903. The variable N and count C are areas secured in the RAM 15.

It is determined at step S2904 whether the count C is greater than the variable N. This processing is terminated if C is greater than N. If C is not greater than N, on the other hand, then the program proceeds to step S2905, where the original outline data and the weight thereof are read out of the ROM 14'. If the original outline data has been prepared for weights of a plurality of types, then all of these are read out. This is followed by step S2906, at which control-point movement vector data is generated in dependence upon the number of items of outline data read out. For example, if original outline data of weights 1 and 10 has been read out at step S2905, then two coordinates are obtained for one control-point. Vector data of a primary function in which the weight of each control-point is a parameter is obtained based upon these coordinates. Similarly, if original control-point data corresponding to three different points has been read out, an control-point movement vector can be expressed by a quadratic function in which weight is a parameter. The amount of movement of an control-point of a weight to be stored as outline data of the kind shown in FIG. 11 is calculated from this control-point movement vector, and data such as the vector-x component 1 is obtained. A method of calculating such an control-point movement vector to be stored as outline data is apparent from the description of the first and second embodiment and need not be described again. Further, in a case where there is only outline data of a single weight, an control-point movement vector is obtained using a movement flag, as described in the third and fourth embodiments. Thus, data relating to the control-point movement vector is created.

It should be noted that a standard horizontal line width, a standard vertical line width, a horizontal amount-of-movement table and a vertical amount-of-movement table used in a case where the technique of the third and fourth embodiments is applied are stored in the ROM 14 and hard disk 17 in advance.

At step S2907, the data is adopted as character outline data inclusive of the control-point movement vector generated at step S2906, and the file is outputted to the character outline-data storage area 1703. The location at which this character outline data has been stored is registered in the pointer area 1702 as an offset value from the head of the file. The pointer of the registration destination of the offset value is decided by the value of the count C. The count C is incremented at step S2908 and the program returns to step S2904, whereby the foregoing processing is repeated.

The degree of the function generated at step S2906 may be registered as outline data. Further, though the number of control-points read out at step S2905 is the number that has been stored as the original outline data, an arrangement may be adopted in which the number of control-points read out is set beforehand in the manner of two types and three types using a keyboard. By adopting this arrangement, the degree of the outline data can be limited appropriately in conformity with the capability of the CPU and the capacity of the memory.

Furthermore, in a case where an control-point that has been read out is at the same position through each weight, the control-point does not move in response to change in weight. This means that there is no movement information. In such case, the fact that there is no movement information may be expressed by a flag (see FIGS. 6 and 11).

Thus, as set forth above, control-point data having control-point movement vector data for dealing with a plurality of weights is stored in the hard disk 27. Accordingly, with the outline forming apparatus of the sixth embodiment, control-point movement vector information is generated from original outline data that has been provided, and it is possible to store this information in the hard disk as outline data having movement information for dealing with weight. Accordingly, the capacity of the storage medium for providing the original outline data need not be large.

In accordance with the outline forming apparatus of each embodiment described above, it is possible to provide each point on a character outline with vector information for making weight variable. This provides the following effects:

1. The thickness of a character based upon a desired weight value can be calculated in real time from one type of outline data (first through fifth embodiments).

2. It possible to provide information for changing weight with a light memory capacity (first through fifth embodiments)

3. The outlines of characters having different weights can be calculated at high speed (first through fifth embodiments).

4. Data management for assigning a vector to outline data is easy (first through fifth embodiments).

5. The creation and fetching of vector data assigned to outline data can be performed easily and at high quality (second through sixth embodiments).

6. Special design for assigning a vector to outline data is unnecessary, and it is easy to achieve communality with conventional data. Further, it is easy to achieve communality of modules for generating a bitmap font from an outline font (third and fourth embodiments).

7. Since complexity of calculation can be changed in dependence upon quality, the present invention can be applied to a variety of apparatus with ease (second and fourth embodiments).

8. The complexity of data can be changed in dependence upon memory capacity, and it is possible to conserve memory (sixth embodiment).

9. The complexity of data can be changed in conformity with the CPU, and customizing suited to the particular system is possible (second, fourth and sixth embodiments).

10. Outline data can be generated by the same method of development irrespective of the method of creating vectors that change weight (first through sixth embodiments).

In accordance with the method and apparatus for forming outlines of the present invention as described above, characters having a plurality of weights can be generated using one type of outline data.

Furthermore, in accordance with the method and apparatus for storing outline data according to the present invention, movement information of each control-point for making it possible to generate characters having a plurality of weights is generated and it is possible to store the movement information together with position information of each control-point of the outline data.

Furthermore, the present invention can be applied to a system comprising either a plurality of units or a single unit. It goes without saying that the present invention can be applied to a case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. An outline processing apparatus, comprising:
   a storage unit configured to store coordinate values of a plurality of outline points of a character corresponding to a character code, and a plurality of vector data corresponding to each of the plurality of outline points, wherein each of the plurality of vector data includes x vector data and y vector data that indicates moving amounts in x and y directions of the corresponding outline point, respectively, and wherein at least one outline point of the plurality of outline points has at least one of x and y vector data that changes in accordance with a weight value change of the character, where the character size remains the same;
   a receiving unit configured to receive a character code and a weight value;
   a reading unit configured to read out coordinate values of the plurality of outline points corresponding to the received character code from said storage unit;
   an acquisition unit configured to acquire the x and y vector data corresponding to the coordinate values and the weight value read by said reading unit; and
   a calculation unit configured to convert the coordinate values read by said reading unit based on the x and y vector data acquired by said acquisition unit, wherein an x-coordinate value of the coordinate values does not change if the x vector data were not acquired, and a y-coordinate value of the coordinate values does not change if the y vector data were not acquired.

2. The apparatus according to claim 1, further comprising a sending unit for sending the coordinate data calculated by said calculation unit.

3. The apparatus according to claim 1, wherein the plurality of vector data includes vector data indicating a straight line and vector data indicating a curve of second or higher degree for one outline point in the same character space.

4. The apparatus according to claim 1, further comprising an output unit adapted to output a pattern formed based on the coordinate data calculated by said calculation unit.

5. The apparatus according to claim 4, wherein said output unit includes a printer.

6. The apparatus according to claim 4, wherein the degree information includes an information indicating that coordinate data is constant regardless of the change of weight value.

7. The apparatus according to claim 1, wherein said storage unit stores degree information indicating degree of a function of vector data for the x direction and the y direction independently.

8. An outline processing method, comprising the steps of:
   storing, in a storage unit, coordinate values of a plurality of outline points of a character corresponding to a character code, and a plurality of vector data corresponding to each of the plurality of outline points, wherein each of the plurality of vector data includes x vector data and y vector data that indicates moving amounts in x and y directions of the corresponding outline point, respectively, and wherein at least one outline point of the plurality of outline points has at least one of x and y vector data that changes in accordance with a weight value change of the character, where the character size remains the same;
   receiving a character code and a weight value;
   reading out coordinate values of the plurality of outline points corresponding to the received character code from the storage unit;
   acquiring the x and y vector data corresponding to the coordinate values and the weight value read in said reading step; and
   converting the coordinate values read in said reading step based on the x and y vector data acquired in said acquiring step, wherein an x-coordinate value of the coordinate values does not change if the x vector data were not acquired, and a y-coordinate value of the coordinate values does not change if the y vector data were not acquired.

9. A computer program product, comprising computer-readable codes adapted to cause a programmable computer to perform an outline method, said method comprising the steps of:
   storing, in a storage unit, coordinate values of a plurality of outline points of a character corresponding to a character code, and a plurality of vector data corresponding to each of the plurality of outline points, wherein each of the plurality of vector data include x vector data and y vector data that indicates moving amounts in x and y directions of the corresponding outline point, respectively, and wherein at least one outline point of the plurality of outline points has at least one of x and y vector data that changes in accordance with a weight value change of the character, where the character size remains the same;
   receiving a character code and a weight value;
   reading out coordinate values of the plurality of outline points corresponding to the received character code from the storage unit;
   acquiring the x and y vector data corresponding to the coordinate values and the weight value read in said reading step; and
   converting the coordinate values read in said reading step based on the vector data acquired in said acquiring step, wherein a x-coordinate value of the coordinate values does not change if the x vector data were not acquired, and a y-coordinate value of the coordinate values does not change if the y vector data were not acquired.

10. A computer-readable memory medium, storing computer-readable codes adapted to cause a programmable computer to perform an outline method, said method comprising the steps of:
    storing, in a storage unit, coordinate values of a plurality of outline points of a character corresponding to a character code, and a plurality of vector data corresponding to each of the plurality of outline points, wherein each of the plurality of vector data includes x vector data and y vector data that indicates moving amounts in x and y directions of the corresponding outline point, respectively, and wherein at least one outline point of the plurality of outline points has at least one of x and y vector data that changes in accordance with a weight value change of the character, where the character size remains the same;

receiving a character code and a weight value;

reading out coordinate values of the plurality of outline points corresponding to the received character code from the storage unit;

acquiring the x and y vector data corresponding to the coordinate values and the weight value read in said reading step; and converting the coordinate values read in said reading step based on the vector data acquired in said acquiring step, wherein an x-coordinate value of the coordinate values does not change if the x vector data were not acquired, and a y-coordinate value of the coordinate values does not change if the y vector data were not acquired.

* * * * *